(12) United States Patent
Kinoshita et al.

(10) Patent No.: US 7,834,502 B2
(45) Date of Patent: Nov. 16, 2010

(54) ROTATING MECHANISM

(76) Inventors: Hiromichi Kinoshita, 1-34-43 Kuriharachuo, Zama-shi, Kanagawa (JP) 228-0014; Yoko Kinoshita, 1-34-43 Kuriharachuo, Zama-shi, Kanagawa (JP) 228-0014

( * ) Notice: Subject to any disclaimer, the term of this patent is extended or adjusted under 35 U.S.C. 154(b) by 286 days.

(21) Appl. No.: 11/887,892

(22) PCT Filed: Mar. 28, 2006

(86) PCT No.: PCT/JP2006/306233
§ 371 (c)(1),
(2), (4) Date: Oct. 4, 2007

(87) PCT Pub. No.: WO2006/106647
PCT Pub. Date: Oct. 12, 2006

(65) Prior Publication Data
US 2009/0051239 A1 Feb. 26, 2009

(30) Foreign Application Priority Data

| Apr. 4, 2005 | (JP) | ............................ 2005-132993 |
| Jul. 8, 2005 | (JP) | ............................ 2005-227187 |
| Jul. 8, 2005 | (JP) | ............................ 2005-227188 |
| Jul. 8, 2005 | (JP) | ............................ 2005-227189 |

(51) Int. Cl.
*H02K 21/00* (2006.01)
(52) U.S. Cl. .................................................. 310/152
(58) Field of Classification Search .................. 310/152, 310/20, 80
See application file for complete search history.

(56) References Cited

U.S. PATENT DOCUMENTS

| 4,267,647 | A | * | 5/1981 | Anderson et al. | ........... 434/301 |
| 5,594,289 | A | * | 1/1997 | Minato | ....................... 310/152 |
| 6,084,322 | A | * | 7/2000 | Rounds | ....................... 310/46 |
| 7,148,596 | B2 | * | 12/2006 | Minato et al. | ............... 310/113 |
| 2004/0061394 | A1 | | 4/2004 | Gotoh et al. | |

FOREIGN PATENT DOCUMENTS

| JP | 58119622 | 8/1983 |
| JP | 63-268480 | 11/1988 |
| JP | 64-012883 | 1/1989 |
| JP | 05011788 | 2/1993 |

(Continued)

OTHER PUBLICATIONS

Introduction to Electrodynamics, Davis J. Griffiths, 1999, Prentice Hall Inc., p. 207.*

(Continued)

*Primary Examiner*—Nguyen N Hanh
(74) *Attorney, Agent, or Firm*—Young Basile

(57) ABSTRACT

The present invention has an object to provide a rotating mechanism with a very high rotation efficiency in which rotation resistance is reduced and rotation is encouraged. It comprises a fixed member having bearings and a rotary member including a rotary shaft journalled by the bearings and a disk member fixed on the rotary shaft. A plurality of coils is mounted on the fixed member and arranged at regular intervals on a circle centered on the rotary shaft, and first permanent magnets are mounted on the disk member, arranged at regular intervals on a circle centered on the rotary shaft and arranged to face the coils.

9 Claims, 22 Drawing Sheets

| | FOREIGN PATENT DOCUMENTS | |
|---|---|---|
| JP | 05-219666 A | 8/1993 |
| JP | 08-116656 A | 5/1996 |
| JP | 63-064564 | 3/1998 |
| JP | 2000-197327 | 7/2000 |
| JP | 2001-45739 | 2/2001 |
| JP | 2004-084897 A | 3/2004 |
| JP | 51-130006 U | 10/2009 |
| SU | A-109356 | 1/1957 |
| SU | A-811423 | 7/1981 |

OTHER PUBLICATIONS

International Search Report Dated Jun. 9, 2006.
Office Action dated Aug. 7, 2008 issued by the Eurasian Patent Office for the corresponding Eurasian Patent Application No. 200702164 together with an English translation thereof.

* cited by examiner

ROTATING MECHANISM

FIELD OF THE INVENTION

The present invention relates to a rotating mechanism constituting a rotational body structure in an electrical generator, motor or the like, and more particularly to a rotating mechanism of the type which has a vertically extending rotary shaft.

BACKGROUND ART

As one example of such a rotating mechanism, an electromagnetic rotating machine with a magnet rotor has been proposed (for example, see JP Publication No. 2000-197327).

Here, such rotating mechanism has various bearings which journal the rotary shaft, and the rotating mechanism performance depends on the level of rotation resistance. Hence, it is necessary to minimize the rotation resistance to improve the performance or efficiency as a rotating mechanism.

For this purpose, provision of a mechanism which encourages or assists rotation is considered desirable. However, if rotation of the rotating mechanism is encouraged by supplying an electric current, etc., from outside, the input energy would increase only to lower the efficiency of the rotating mechanism.

In JP Publication No. 2000-197327 referred to above, the object is to obtain a DC motor or DC generator which does not use a commutator, a brush and a position sensor and causes no rib torque nor rib voltage but not to contribute to improvement in rotating mechanism efficiency.

SUMMARY OF THE INVENTION

The present invention has been proposed in view of the above problem of the prior art and is intended to provide a rotating mechanism which has a very high rotation efficiency.

A rotating mechanism according to the present invention comprises a fixed member having a bearing, a rotary member including a rotary shaft journalled by the bearing and a disk member provided on the rotary shaft, a plurality of coils which are mounted on the fixed member and arranged at regular intervals on a circle centered on the rotary shaft, and a first permanent magnet mounted on the disk member, wherein first permanent magnets are arranged at regular intervals on a circle centered on the rotary shaft and arranged to face the coils.

Here, it is preferable that the coil be penetrated by a core member of nonmagnetic material (for example, stainless steel) and a member of magnetic material (for example, iron disk or iron plate) be located on its end face away from its end face opposite to the first permanent magnet.

It is preferable that a plurality of arm members be fitted to the disk member, a second permanent magnet be held on the tip of the arm member by a first magnet holding member, a third permanent magnet be provided radially outside the arm member in an area of the fixed member, the third permanent magnet be held by a second magnet holding member, and a repulsive force be generated when the second permanent magnet moves in a direction of rotation from a condition in which the second permanent magnet is in the same circumferential position as the third permanent magnet (condition in which the second permanent magnet and the third permanent magnet are on line).

Here, it is preferable that the number of such third permanent magnets be larger than the number of such arm members.

It is preferable that the first magnet holding member be made of nonmagnetic material (for example, aluminum or plastic) and surround the second permanent magnet and form an open area, which allows radiation of lines of magnetic force from the second permanent magnet, and the second magnet holding member be made of magnetic material (for example, nickel chrome steel) and surround the third permanent magnet and form an open area, which allows radiation of lines of magnetic force from the third permanent magnet. It is further preferable that when the open area of the first magnet holding member and the open area of the second magnet holding member do not face each other, no magnetic interaction occur between the second permanent magnet and the third permanent magnet, but when the open area and the open area face each other, magnetic repulsion occur between the second permanent magnet and the third permanent magnet.

It is preferable that a fourth permanent magnet be mounted on a lower surface of the disk member, a fifth permanent magnet be provided on the fixed member in an area below the fourth permanent magnet, and the fifth permanent magnet be arranged to face the fourth permanent magnet and to have the same polarity as the fourth permanent magnet.

Here, it is preferable that the fourth permanent magnet be mounted on the lower surface of the disk member by a stainless steel fitting (stay) and the fifth permanent magnet be mounted on the fixed member by a stainless steel fitting (stay).

It is preferable that the fixed member be comprised of an upper frame and a lower frame, which are regular polygonal annular or circular, and a connecting member, which connects the upper frame and the lower frame.

In the above rotating mechanism, since it includes plural coils arranged at regular intervals on a circumference on the fixed member and plural first permanent magnets facing the coils of the rotary member, when the rotational body is first rotated by a given means to start rotation, an induced current is generated in the coil in accordance with Fleming's left hand rule. The induced current generated in the coil works to rotate the first permanent magnet in the same direction as when it was initially rotated.

In other words, once the rotational body has been rotated, for example, by a motor, then an induced current is generated in the coil and on the principle of so-called "Aragon's disk," the induces current works to encourage rotation of the rotational body, thereby assuring a very high rotation efficiency.

If the coil is penetrated by a core member of nonmagnetic material (for example, stainless steel) and a member of magnetic material (for example, iron disk or iron plate) is located on its end face away from its end face opposite to the first permanent magnet, the member of magnetic material intensifies the magnetic field generated in the coil, and also if the core member is made of nonmagnetic material, stainless steel in particular, a magnetic field properly passes through the core member and thus a magnetic field is properly generated from the coil.

In addition, since the core member is a nonmagnetic material, it is not attracted by the first permanent magnet, which prevents the rotational body from being braked. Here, since the member of magnetic material is away from the first permanent magnet, it is less likely to be attracted by the first permanent magnet.

In the present invention, if plural arm members are provided, a second permanent magnet is held on the tip of the arm member by a first magnet holding member, a third permanent magnet is provided radially outside the arm member in an area of the fixed member, and the third permanent magnet is held by a second magnet holding member, magnetic repulsion between the second permanent magnet and the third permanent magnet rotates the arm member and adds a torque to the disk member. As a consequence, rotation is encouraged.

In other words, if action made by the coil and the first permanent magnet is considered main action, the second permanent magnet and the third permanent magnet work to increase the action.

If a fourth permanent magnet on the rotary side and a fifth permanent magnet are provided, the fifth permanent magnet is located to face the fourth permanent magnet and its face opposite to the fourth permanent magnet has the same polarity as the fourth permanent magnet so the fourth permanent magnet on the rotary side and the fifth permanent magnet on the fixed side to repel each other. In this way, magnetic repulsion between the permanent magnets works so as the whole rotary member floats from the fixed member.

As a consequence, the thrust exerted on the fixed member by the rotary member can be reduced close to zero, and friction caused by the thrust can be reduced close to zero.

By combining all the above structures and their actions, friction in rotation of the rotary member is reduced close to zero, and a rotating mechanism with a very high rotation efficiency is obtained.

Furthermore, in the present invention, plural coils are arranged like a ring between the fourth permanent magnet and the fifth permanent magnet, ring arrays of coils are vertically spaced, the polarities of the vertically spaced arrays of coils are so determined as to generate a repulsive force, and plural air core coils with their open ends up and down are located between vertically spaced arrays of magnets in order to generate electric power.

The electric power generated by the air core coils between the upper and lower arrays of magnets can drive, for example, a motor mounted on the top of the disk member. Or the electric power generated by the air core coils can drive, for example, a motor provided to rotate the disk member only.

Here, the "motor provided to rotate the disk member only" is connected to the disk member through a gear or belt, and thus it is possible for the disk member to rotate even when the rotary shaft is not connected to a driving source. When electric power is generated by rotating the arrays of coils arranged like rings together with the disk member, it is also possible to rotate only the disk member without rotating the rotary shaft.

Here, if the disk member is so structured as to be able to rotate relatively with respect to the rotary shaft, the disk member can be rotated more effectively by fixing the rotary shaft and letting a thrust bearing provided there bear the weight of the disk member.

In addition, regarding the upper and lower ring arrays of magnets, by fixing the lower array of magnets and mounting the upper array of magnets on the disk member, the disk member can be floated by repulsion between poles of the same polarity. Also, as described above, electric power can be generated in the air core coils by rotation of the disk member.

In this case, rotation of the disk member enhances the effect achieved by a magnetic force.

DISCLOSURE OF THE INVENTION

Next, embodiments of the present invention will be described referring to the accompanying drawings.

First, a rotating mechanism 100 as a first embodiment (embodiment) will be described referring to FIGS. 1 to 11.

Figure 1:
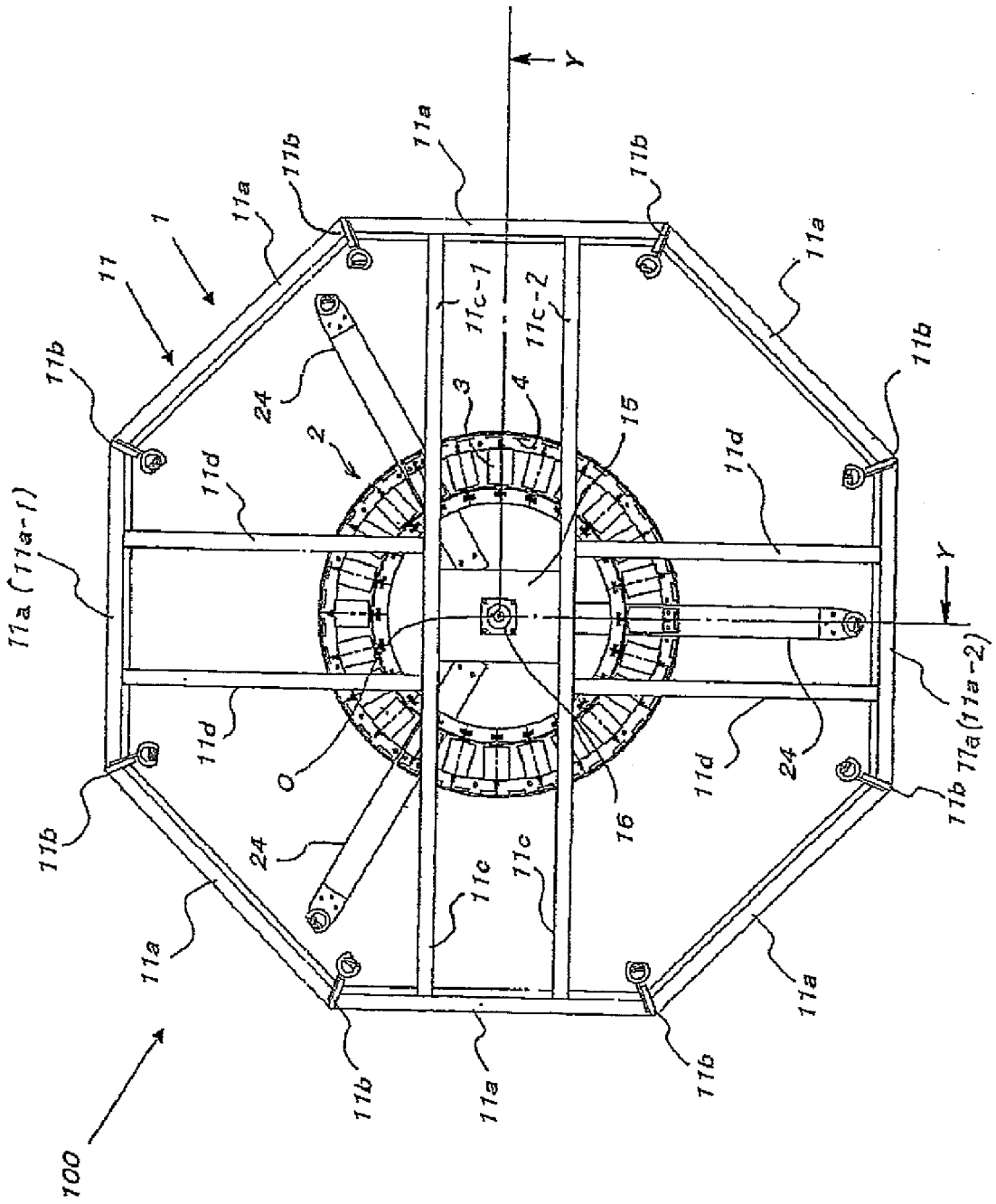
FIG. 1 is a plan view of a first embodiment of the invention.
Figure 2:
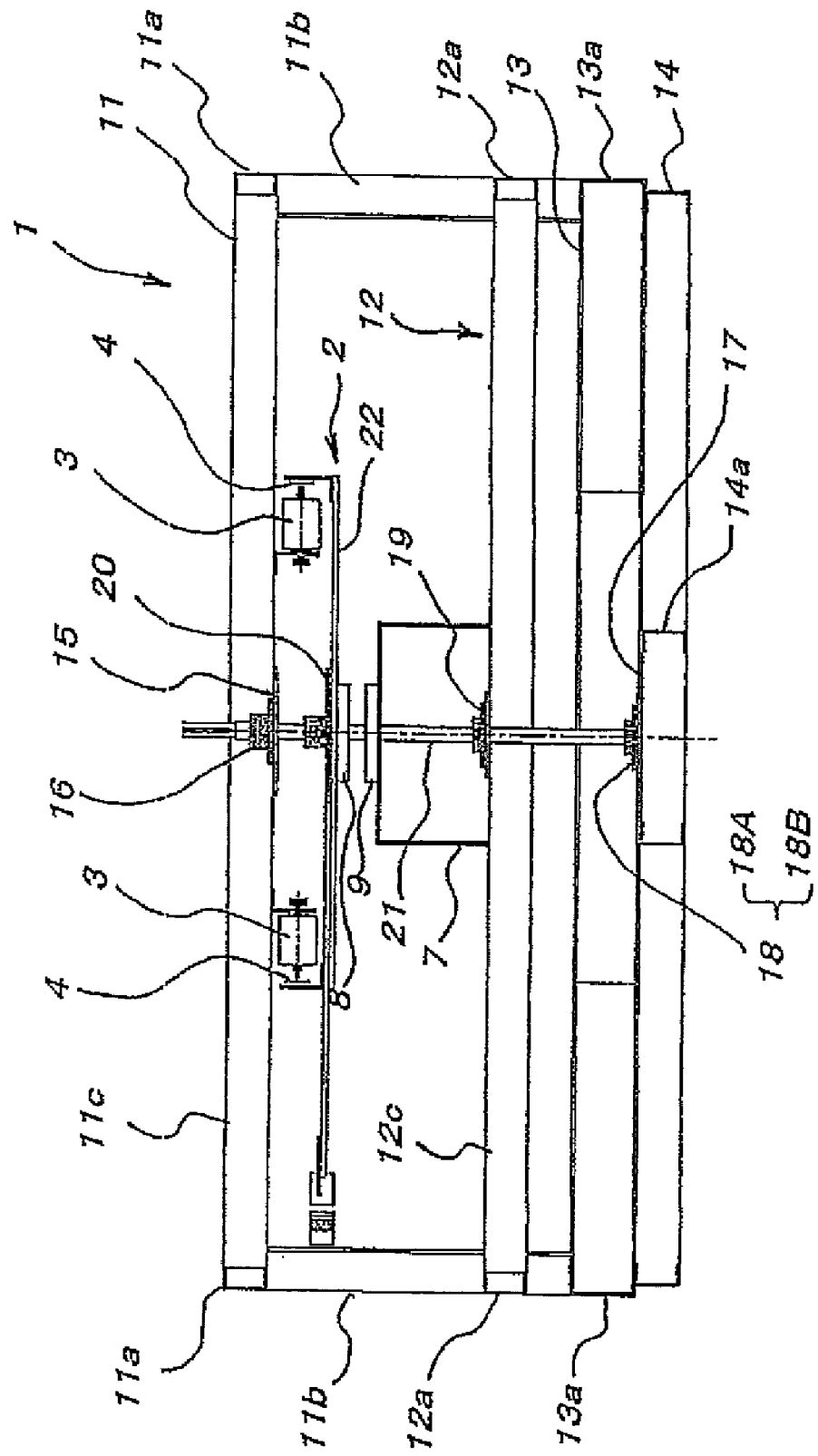
FIG. 2 is a sectional view taken along Y-Y in FIG. 1.

The rotating mechanism, the whole of which is represented by reference numeral 100 in FIGS. 1 and 2, includes a fixed member 1, a rotary member 2, a plurality of coils 3 mounted on the fixed member 1, and a plurality of first permanent magnets 4 mounted on the rotary member 2.

The fixed member 1 is a three-layered structure in which an upper frame 11, a middle frame 12 and a lower frame 13 are stacked through eight connecting members 11b with spaces in the vertical direction (see FIG. 2).

Specifically, the upper frame 11 is formed as an equilateral-octagonal structure assembled by connecting ends of eight members 11a with the same cross-sectional profile (groove type cross section) through the connecting members 11b (see FIG. 1).

Although not clearly shown in FIG. 1, the middle frame 12 has the same contour as the upper frame 11 and, like the upper frame 11, is formed as an equilateral-octagonal structure assembled by connecting ends of eight members 12a with the same cross-sectional profile (groove type cross section) through the connecting members 11b (see FIG. 2).

Although not clearly shown, the lower frame 13 has the same contour as the upper frame 11 and is an equilateral-octagonal structure assembled with eight members 13a with a groove type cross section which are larger than the upper frame 11 and the middle frame 12 (in terms of size in the vertical direction of FIG. 2).

In FIG. 1, in the upper frame 11, the members with a groove type cross section 11a, 11a on the left and right in the figure are connected and reinforced by two beams 11c running parallel to each other horizontally in the figure. The two beams 11c are vertically symmetrical with respect to the center point O of the rotary member 2 (center of rotation, which is also the center point of the upper frame 11).

In FIG. 1, in the upper frame 11, the upper member 11a-1 and the upper beam 11c-1 are connected by two beams 11d running parallel to each other vertically in FIG. 1, and the lower member 11a-2 and the lower beam 11c-2 are connected by two beams 11d running parallel to each other vertically in the figure, thereby reinforcing the whole upper frame 11.

Although not clearly shown, like the upper frame 11, in the middle frame 12, the members with a groove type cross section 12a, 12a on the left and right are connected and reinforced by two beams 12c (see FIG. 2) running parallel to each other horizontally in FIG. 1.

The two beams 12c are symmetrical with respect to the center point O of the middle frame 12 vertically in FIG. 1.

Furthermore, like the upper frame 11 described in reference to FIG. 1, in the middle frame 12, the upper member 12a in FIG. 1 (which lies in the same position as the member 11a-1 in FIG. 1) and the upper beam 12c (which lies in the same position as the beam 11c-1 in FIG. 1) are connected by two beams 12d (not shown) that run parallel to each other vertically in FIG. 1. Also, the lower member 12a (which lies in the same position as the member 11a-2 in FIG. 1) and the lower beam 12c (which lies in the same position as the beam 11c-2 in FIG. 1) are connected and reinforced by two beams 12d (not shown) that run parallel to each other vertically in FIG. 1.

Referring to FIG. 2, the lower frame 13 is mounted on the upper surface of a base member 14 to lie over it, and the outer rim of the base member 14 is smaller than the outer rim of the lower frame 13. A reinforcing member 14a is provided in the center of the base member 14.

In FIG. 1, a bearing supporting plate 15 is supported by the two beams 11c, 11c in an area between the two beams 11c, 11c of the upper frame 11 that also corresponds to the center of the upper frame 11. A radial bearing 16 (upper bearing) is provided on the upper surface of the bearing supporting plate 15. Here, the radial bearing 16 is located with its center axis perpendicular to the paper surface of FIG. 1.

A bearing supporting plate 17 is located in the center of the reinforcing member 14a (provided in the center of the base member 14), and a lower bearing 18 is fitted in the center of the bearing supporting plate 17 (upper surface in FIG. 2). Here, the lower bearing 18 has a structure which combines a radial bearing 18A and a thrust bearing 18B and is located so that the center axis of the lower bearing 18 extends vertically in FIG. 2 (direction perpendicular to the paper surface of FIG. 1).

In the embodiment shown in FIG. 2, a radial bearing (middle bearing) 19 is fitted in the center of the middle frame 12 as well.

As is apparent from FIG. 2, the center axis of the middle bearing 19 and the center axis of the upper bearing 16 overlap on an extension of the center axis of the lower bearing 18.

The rotary shaft 21 is journalled by the upper bearing 16, middle bearing 19 and lower bearing 18.

In the rotary shaft 21, a disk member (for example, an aluminum disk) 22 is fixed to the rotary shaft 21 through a hub 20 in the area between the upper bearing 16 and the middle bearing 19.

In other words, the rotary member 2 has a rotary shaft 21 and a disk member 22 as major components.

As will be described later, rotation of the aluminum (or plastic) disk 22 is assisted by the principle of "Aragon's disk" on which electric power consumption meters are based.

Here, the rotary shaft 21 is made of nonmagnetic material such as stainless steel in order to avoid the influence of a fourth and a fifth permanent magnet which will be stated later.

The disk member 22 has a mass above a given level so as to exert an effect of holding a torque as a so-called flywheel (pulley).

When aluminum or synthetic resin is used as the material for the disk member 22, it is more effective.

Figure 3:
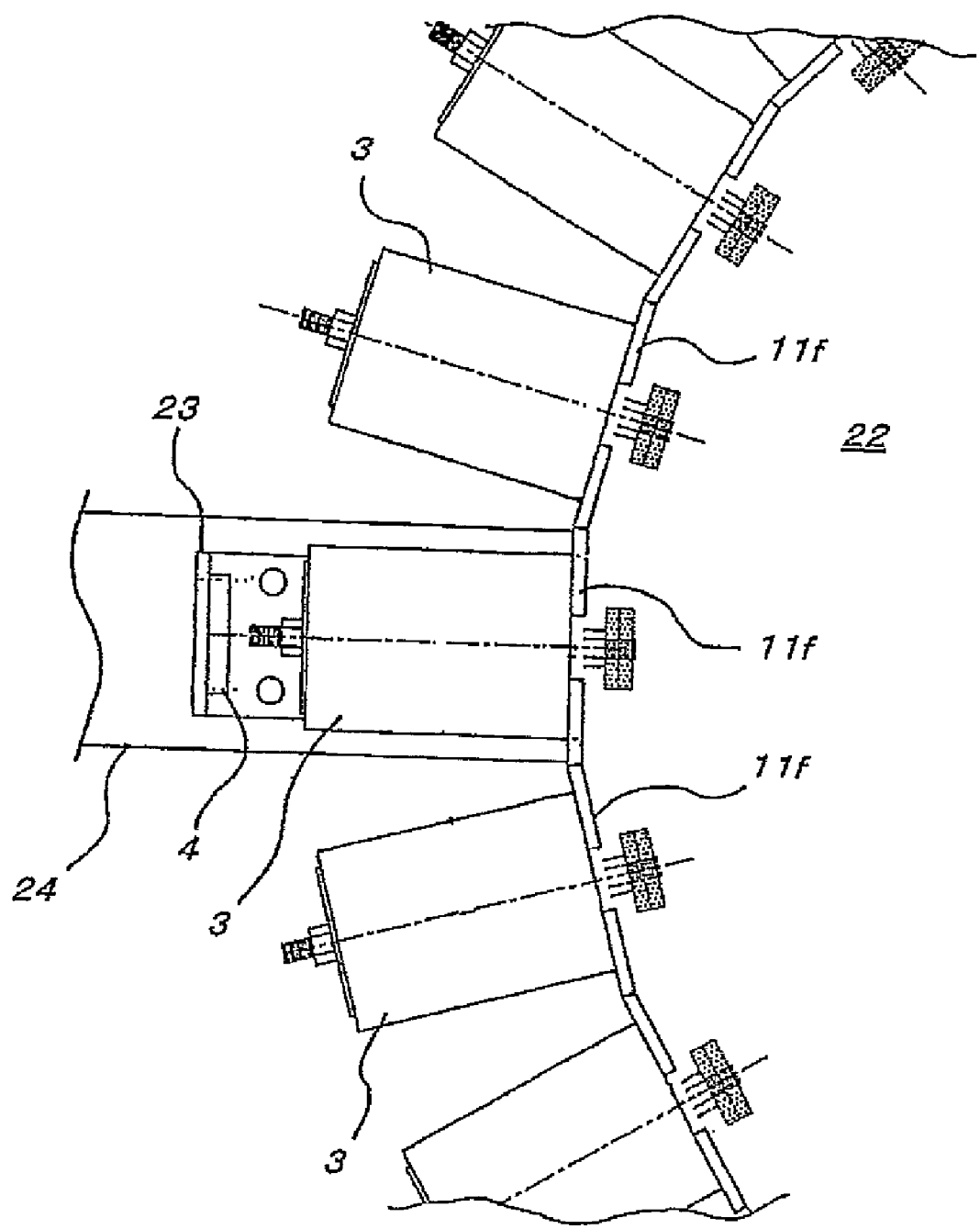
FIG. 3 is an enlarged fragmentary view of what is shown in FIG. 1.
Figure 4:
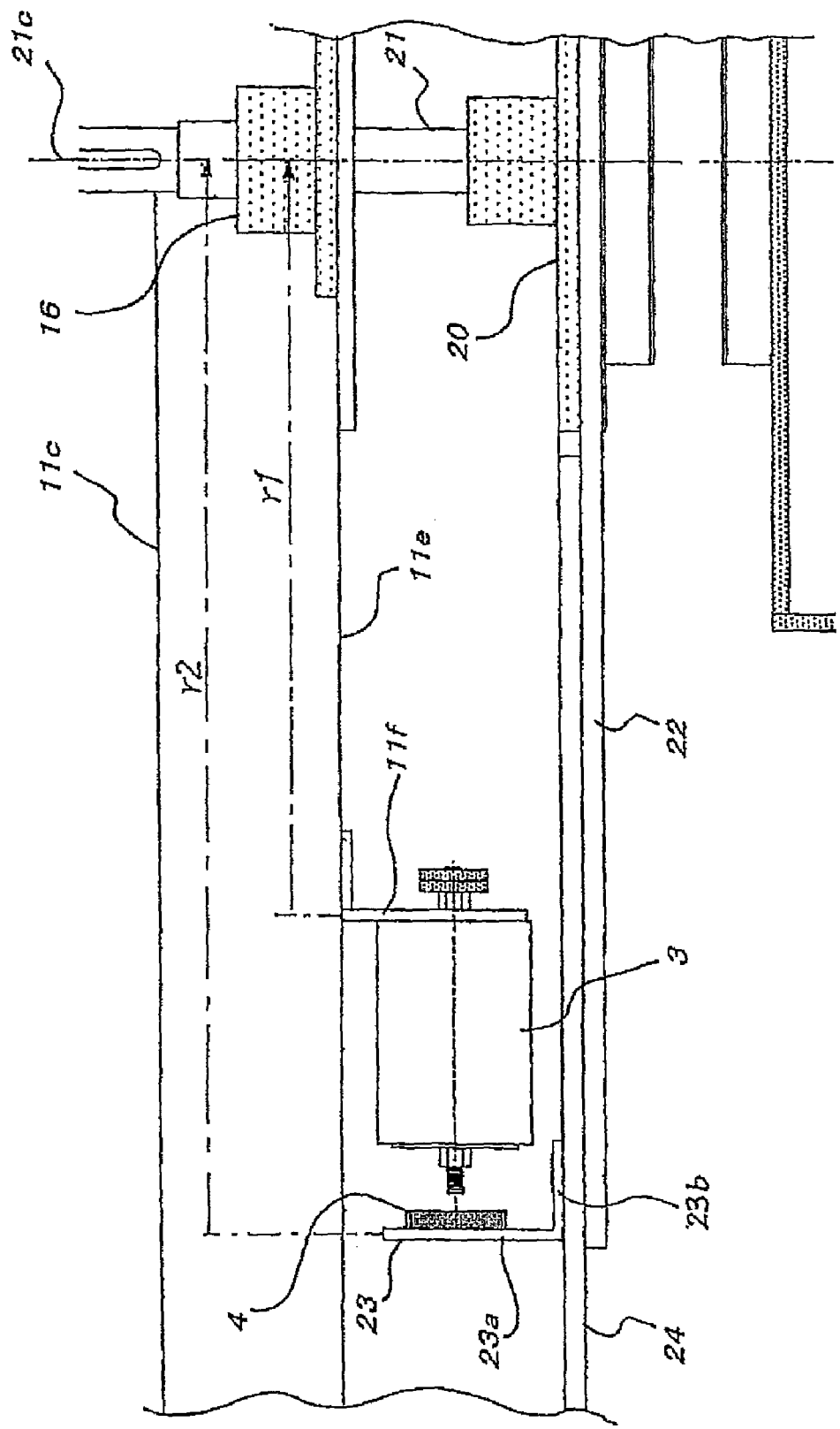
FIG. 4 is an enlarged fragmentary view of what is shown in FIG. 2.

Referring to FIGS. 3 and 4, in the disk member 22, a plurality of brackets 23 for permanent magnets which have an L-shaped cross section are fitted at regular intervals all around the outer rim of the disk member 22. Here, for simple illustration, only one bracket 23 is shown and the other brackets 23 are not shown.

Although not shown, in FIGS. 3 and 4, it is also possible to provide one annular member 23 in place of plural brackets 23 so that the annular member 23 is mounted on the disk member 22 by a fitting 23b.

In FIGS. 3 and 4, a first permanent magnet 4 is fitted to the radially inner surface (surface nearer to the rotary shaft 21) of a flange part 23a of each bracket 23. Here, first permanent magnets 4 neighboring along the circumferential direction are arranged in such a way that the polarities of their radially inner surfaces alternate between the N pole and the S pole.

The cross section of the bracket 23 shown in FIG. 4 is a cross section at a special point where an arm member 24 (which will be described later) is mounted on the upper surface of the disk member 22 (cross section indicated by Y in FIG. 1).

Although not shown, in an ordinary cross section without an arm member 24, the height of the flange part 23a of the bracket 23 and the position of the first permanent magnet 4 are larger than the height of the flange part 23a and the position of the first permanent magnet 4 as shown in FIG. 4 by the amount equivalent to the thickness of an arm member 24.

Although not shown in FIGS. 1 and 2, reference numeral 11e in FIG. 4 represents a canopy which covers the upper portion of the rotating mechanism 100. The canopy 11e covers all the areas except the members 11a, beams 11c and beams 11d of the upper frame 11 and the bearing supporting plate 15.

In FIG. 4, an L-shaped bracket for a coil, 11f, is provided at a distance of r1 (radial distance) from the axial center 21c of the rotary shaft 21 with its top down in FIG. 4. A plurality of coil brackets 11f is provided all around the disk member 22 at regular intervals.

Here, the radial distance r1 of the coil bracket 11f is shorter than the radial distance r2 of the bracket 23 (radial distance from the axial center 21c to the bracket 23).

A coil 3 is fitted to the coil bracket 11f's side (radially outer side) opposite to the permanent magnet bracket 23 by a means which will be described later. Here, the coil 3 is a so-called electromagnetic coil which generates a magnetic field when energized. More specifically, the coil 3 is so structured that when the coil 3 is energized, a magnetic field is generated in the coil 3 and the magnetic filed causes mutual inductance to occur between the coil 3 and the first permanent magnet 4.

When the first permanent magnet 4 rotates together with the disk member 22 and crosses the magnetic field of the coil 3, an induced current is generated in the coil 3. If the rotational body 2 is rotated by a given means, for example, a small motor (not shown) in accordance with Faraday's law, an induced current is generated in the coil 3 when the first permanent magnet 4 passes the magnetic field of the coil 3.

Due to the induced current generated in the coil 3, the first permanent magnet 4 and the disk member 22 are impelled to rotate in the same direction as they were initially rotated. As a consequence, once the rotary member 2 has been rotated by some means (for example, a motor), the induced current generated in the coil 3 impels the rotary member 2 to continue rotating.

Although not clearly shown, the first embodiment is structured as a type in which the rotary member 2 rotates upon start of a small motor (for starting) and so that a clutch means is interposed between the rotary shaft and the starting motor. When the rotary member reaches a prescribed rotation speed, the clutch is turned off.

Next, referring to FIGS. 5 to 7, the detailed positional relation between the coil 3 and the first permanent magnet 4 and the detailed structure of the coil will be described.

Figure 5:
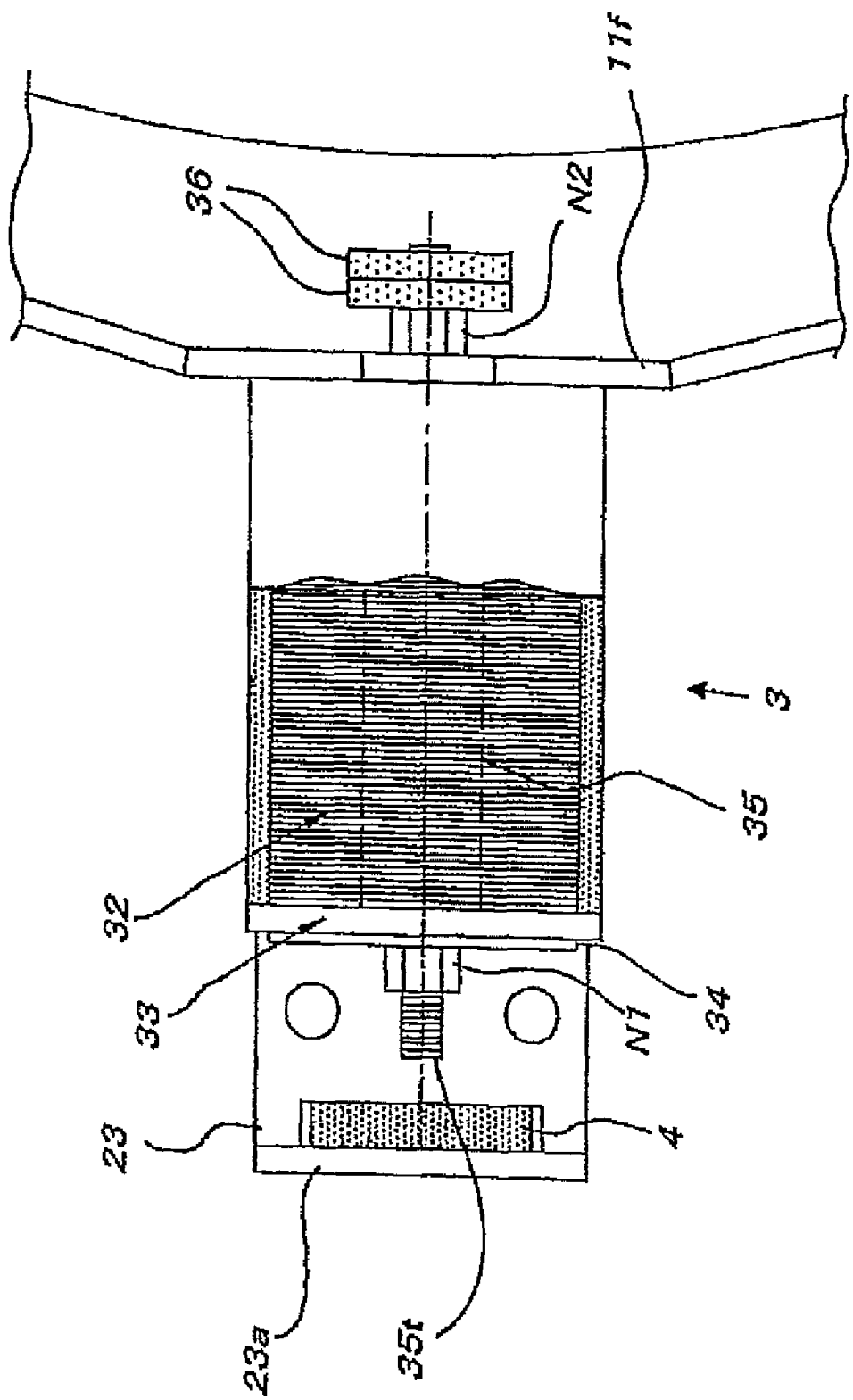
FIG. 5 is a plan view showing details of a coil and a permanent magnet in the first embodiment.
Figure 6:
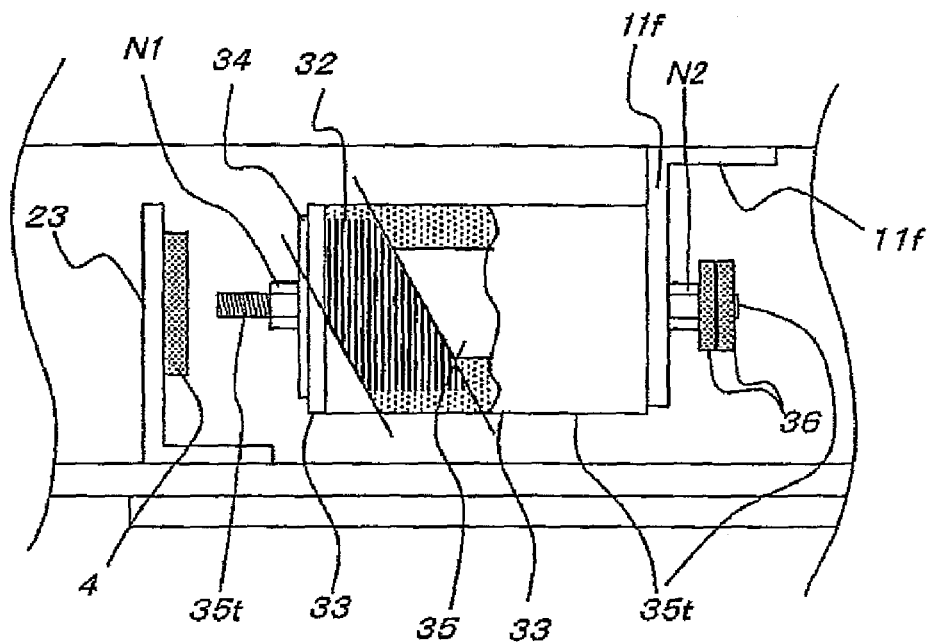
FIG. 6 is a sectional view showing details of a coil and a permanent magnet in the first embodiment.
Figure 7:
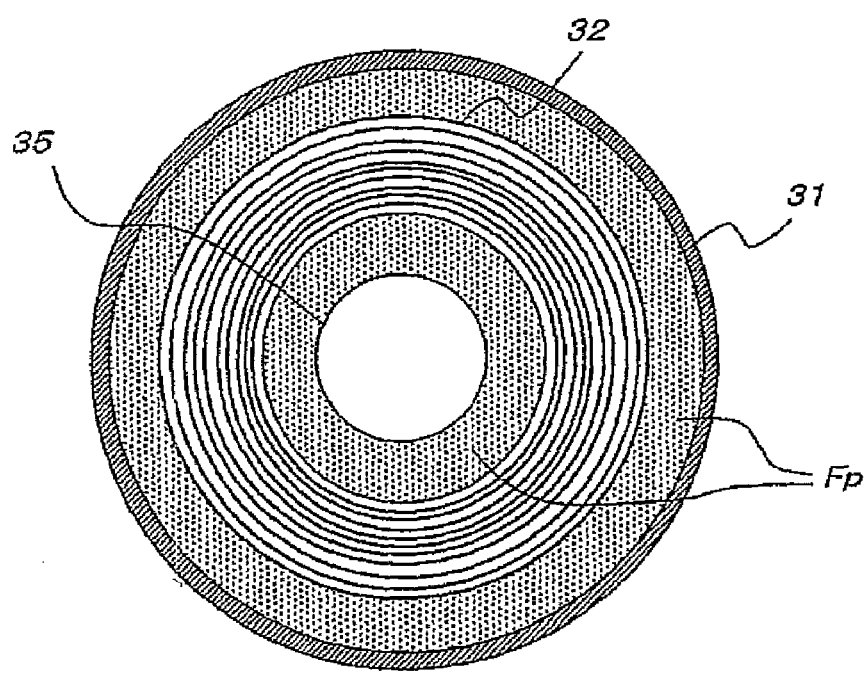
FIG. 7 is a sectional view of the coil shown in FIGS. 5 and 6.

In FIGS. 5 to 7, the coil 3 includes a coil body 32, a plate member 33 provided on an end of the coil body 32, and a pressure plate 34 for pressing the plate member 33 in FIG. 5. Here, the pressure plate 34 is made of nonmagnetic material for the reason which will be described later.

The coil body 32, plate member 33 and pressure plate 34 are penetrated by a stainless steel core member 35, which also serves as a through bolt.

An external (male) thread 35t is formed on the stainless steel core member 35's portion except its portion penetrating the coil body 32. A first nut N1 is screwed on the external thread 35t. By tightening the first nut N1, the clearance between the plate member 33 and the pressure plate 34 is shortened.

A nut N2 is screwed on the external thread 35t in a region where the stainless steel core member 35 penetrates the coil bracket 11f. The coil 3 is fitted to the coil bracket 11f by sandwiching the coil bracket 11f with the nut N2.

FIG. 7 is a sectional view of the coil 3's center in the longitudinal direction (left/right direction in FIGS. 5 and 6).

In FIGS. 5 and 6, reference numeral 36 represents a plate member (iron plate) of magnetic material (for example, iron) with a through hole for a bolt in its center.

A conventional coil often uses an iron core in the coil center in order to increase the magnetic flux density. However, in the first embodiment illustrated, there is a problem that since the core member of the coil 3 moves in the immediate vicinity of the permanent magnet 4 (see FIGS. 5 and 6), if the core member of the coil 3 is an iron core, the core member of the coil 3 would be attracted to the permanent magnet 4. This attractive force would brake the rotation of the disk member 22.

Here, if the core of coil 3 is made of stainless steel, it is not attracted to the permanent magnet 4 but allows a magnetic field to pass through it.

Therefore, the coil 3 used in the first embodiment employs a stainless steel core member 35 as the core member of the coil 3 to prevent the core member of the coil 3 from being attracted to the permanent magnet 4. In addition, since a magnetic field passes through the stainless steel core member 35, when the stainless steel core member 35 is inserted into the coil 3, the effect of the coil 3, namely the effect of encouraging rotation of the disk member 22 by the permanent magnet 4 as an electromagnet and self-inductance, is not hindered.

In addition, in the first embodiment illustrated, the iron member (iron plate) 36 is provided in the remotest position of the coil 3 from the permanent magnet 4 (right end in FIGS. 5 and 6) so that the magnetic field passing through the stainless steel core member 35 is intensified as it passes through the iron plate 36. In other words, the presence of the iron plate 36 ensures the effect of intensifying the magnetic field as in the case of an ordinary coil which has an iron core in it.

Furthermore, since the iron plate 36 is located in the remotest position from the permanent magnet 4, the risk that the iron plate may be attracted by the magnetic field of the permanent magnet 4 so rotation of the disk member 22 may be braked is extremely low or negligible.

In short, due to the use of the coil 3 as illustrated in FIGS. 5 and 6, as the permanent magnet passes, a strong magnetic field generated in the coil 3 generates an electric current without causing braking of rotation of the disk member 22.

Although the iron plate 36 is provided on the radially inner side of the coil 3 to intensify the magnetic field generated in the coil 3 as shown in FIGS. 5 and 6, another possible approach is to, instead of providing an iron disk 36 on each coil 3, locate an iron plate (not shown) on the coil bracket 11f's radially inner side (side away from the permanent magnet) where the iron plate is a single continuous ring. This means that this single continuous annular disk exerts the effect of intensifying, on the radially inner sides of brackets 11f for individual coils 3, magnetic fields generated in the corresponding individual coils 3.

In order to increase the rotation efficiency of the rotating mechanism 100, the first embodiment includes arm members 24 (see FIG. 1) in addition to the above structure.

Figure 8:
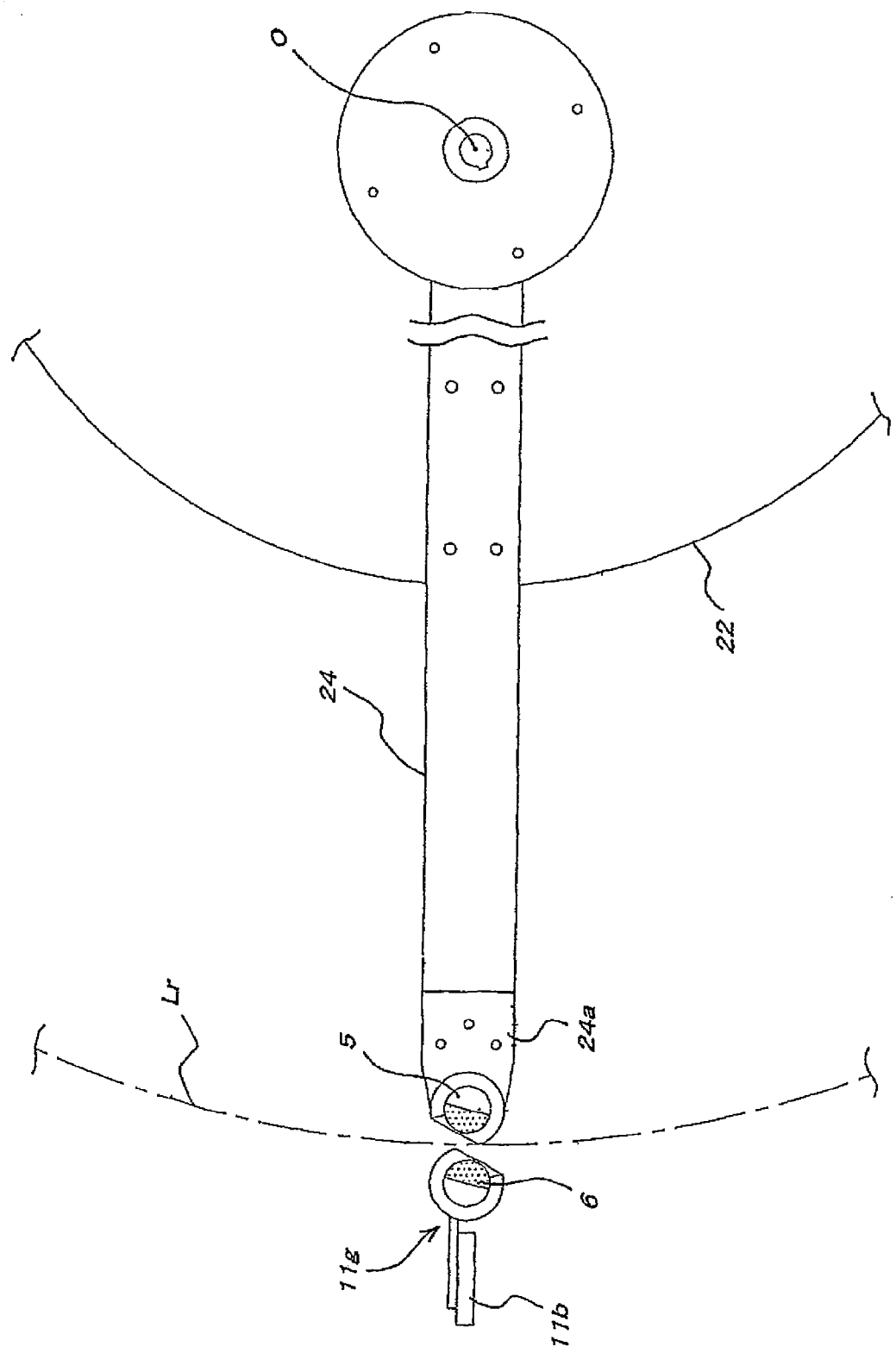
FIG. 8 is a plan view showing an arm member with a second permanent magnet and a third permanent magnet.

In FIGS. 1 and 8, three arm members 24 (only one is shown in FIG. 8) extend radially outside on the upper surface of the disk member 22. As is apparent from FIG. 1, the three arm members 24 are mounted at regular intervals in the circumferential direction.

An attachment 24a holding a second permanent magnet 5 is fitted to the tip of the arm member 24.

As will be described later, in the attachment 24a at the tip of the arm member 24, the second permanent magnet 5 is mostly covered by a holder 24h. The holder 24h is made of nickel chrome steel, a magnetic material.

Since both the permanent magnet 5 and the permanent magnet 6 are surrounded by nickel chrome steel, magnetism is reduced.

An attachment 11g holding the third permanent magnet 6 is fitted to each of the eight connecting members 11b of the upper frame 11 of the fixed member 1, and the attachment 11g is oriented radially inward (toward the center of rotation O in FIG. 8).

Here, FIG. 8 shows that the arm member 24 rotates and the center of the second permanent magnet 5 comes on a virtual line (not shown in FIG. 8) connecting the third permanent magnet 6 and the center of rotation O. Arc Lr in FIG. 8 represents the trajectory of the radially outer end of the attachment 24a at the tip of the arm member 24.

The number of arm members 24 or second permanent magnets 5 (three in the embodiment shown here) and the number of third permanent magnets 6 (eight in the embodiment illustrated here) are determined from the viewpoint of prevention of "torque ripple" which would arise as the plural second permanent magnets 5 approach the fixed third permanent magnets 6 simultaneously.

Next, primarily referring to FIGS. 9 and 10, the advantageous effect that the attachment 24a on the arm member 24 (for the second permanent magnet 5) and the attachment 11g on the upper frame 11 (for the third permanent magnet 6) as shown in FIG. 8 encourage rotation of the disk member 22 (FIG. 1) will be described.

Figure 9:
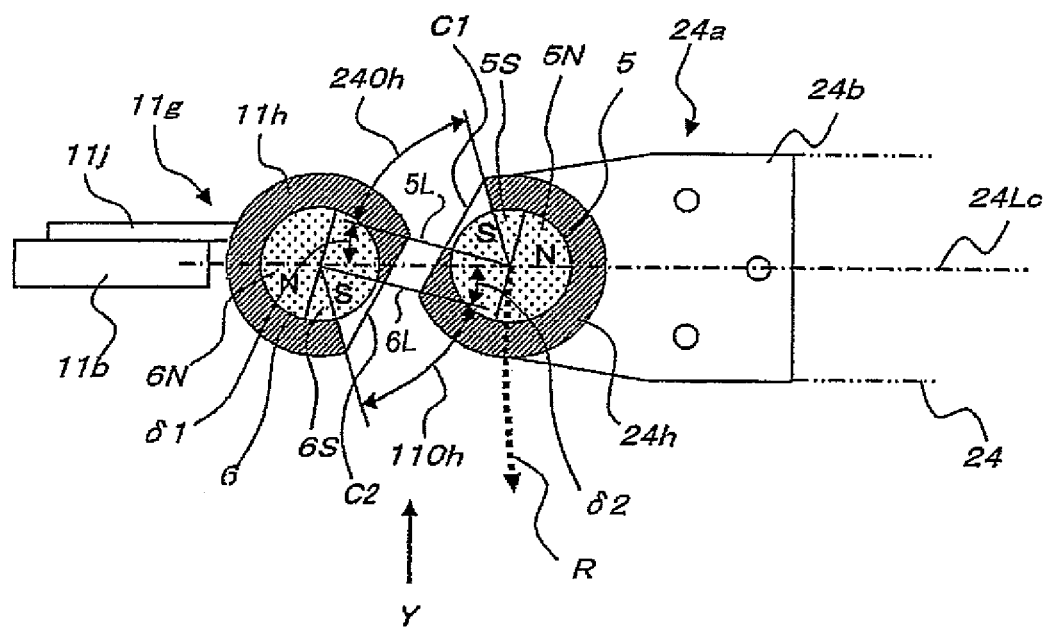
FIG. 9 is an enlarged fragmentary plan view of what is shown in FIG. 8.
Figure 10:
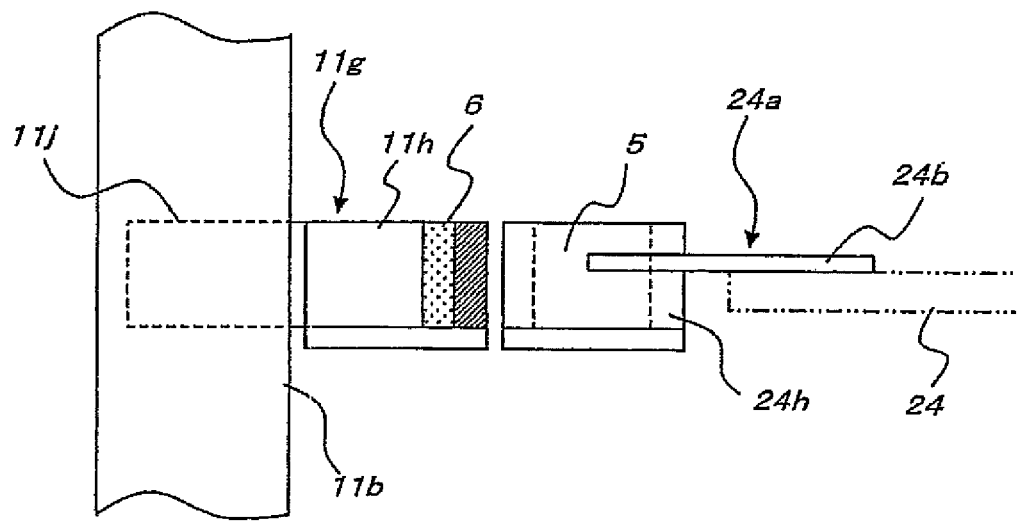
FIG. 10 is a view taken in the direction of arrow Y in FIG. 9.

In FIGS. 9 and 10, the attachment 24a on the arm member is comprised of a second permanent magnet 5, a holder 24h holding the second permanent magnet 5 in a way to cover most of it, and a fitting member 24b for fixing the attachment 24a to the tip of the arm member 24.

The attachment 11g on the upper frame 11 (left in FIGS. 9 and 10) is comprised of a third permanent magnet 6, a holder 11h holding the third permanent magnet 6 in a way to cover most of it, and a fitting member 11j for fixing the attachment 11g to the connecting member 11b.

In the embodiment illustrated, the holder 24h for holding the second permanent magnet 5 and the holder 11h for holding the third permanent magnet 6 are both made of nickel chrome steel, a magnetic material.

The holder 24h and the holder 11h cover most of the second permanent magnet 5 or the third permanent magnet 6 to prevent magnetic field leakage. However, on their sides facing each other, namely on the holder 24h's radially outer side or side nearer to the connecting member 11b, and the holder 11h's radially inner side or side nearer to the arm 24, the permanent magnets are partially not covered by the nickel chrome steel.

More specifically, the holder 24h for holding the second permanent magnet 5 takes the form of a cylinder with its bottom closed (see FIG. 10) and part of its periphery (radially outer part) is cut out along the center axis of the cylinder so as to expose the second permanent magnet 5 (forming an open area 240h). Although the center axis of the cylinder is not shown here, in FIG. 9 the center axis extends perpendicularly to the paper surface and in FIG. 10 it extends up/down or vertically.

In FIG. 9, one end of the open area 240h (start point of the open area 240h) is in a position delayed by angle δ1 (15 degrees in the example shown here) from line 24Lc corresponding to the centerline of the arm member 24 (a position above the line in FIG. 9) in the direction of rotation of the arm member 24 (direction indicated by arrowed dotted line R). In FIG. 9, one end of the open area 240h (start point of the open area 240h) is indicated by line 5L (line connecting the start point of the open area 240h and the center point of the permanent magnet 5).

The opening angle of the open area 240h is 60 degrees in FIG. 9. In other words, the open area 240h lies from the above one end (start point of the open area 240h) to a point turned clockwise 60 degrees from it.

Also, in the holder 24h, its periphery including the open area 240h is chipped off so as to form a portion C1 inclined upward to the right. The inclination angle of the inclined portion C1 is 28 degrees with respect to the vertical axis (not shown) in FIG. 9.

As is apparent from FIGS. 9 and 10, the second permanent magnet 5 takes the form of a cylinder whose outside diameter is the same as the inside diameter of the holder 24h. Regarding the polarities of the second permanent magnet 5, assuming that it is vertically halved along the axial center of the cylinder, one half is the S pole (5S: left in FIG. 9) and the other half is the N pole (5N: right in FIG. 9).

Here, the halving plane of the second permanent magnet 5 is orthogonal to line 5L indicating the start point of the open area 240h, and the "halving plane" is inclined 15 degrees with respect to the vertical axis (not shown).

The holder 11h for holding the third permanent magnet 6 takes the form of a cylinder with its bottom closed, and part of the periphery of the cylinder is open (that is, it has an open area 110h in the periphery).

In FIG. 9, one end of the open area 110h (or start point of the open area 110h) is in a position advanced by angle δ2 (15 degrees in the example shown here) downward in FIG. 9 from an extension (which passes the center point of the third permanent magnet 6) of line 24Lc of the arm member 24, or turned clockwise by angle δ2 from the extension of line 24Lc.

In FIG. 9, one end of the open area 110h (or start point of the open area 110h) is expressed by line 6L (a line connecting the start point of the open area 110h and the center point of the permanent magnet 6).

The open area 110h lies from the above one end or line 5S 6L to a point turned clockwise by an opening angle from it. The opening angle is 60 degrees in the example in FIG. 9.

The open area 110h is chipped off so as to form an inclined portion C2. The inclined portion C2 is inclined 28 degrees vertically in FIG. 9 in the example shown here.

The third permanent magnet 6 takes the form of a cylinder whose outside diameter is the same as the inside diameter of the holder 11h. Regarding the polarities of the third permanent magnet 6, assuming that it is vertically halved along the axial center of the cylinder, one half is the S pole (6S: right in FIG. 9) and the other half is the N pole (6N: left in FIG. 9).

The halving plane of the third permanent magnet 6 is orthogonal to the line 6L (a line connecting the start point of the open area 110h and the center point of the permanent magnet 6). In the example in FIG. 9, the halving plane of the third permanent magnet 6 is inclined 15 degrees with respect to the vertical axis (not shown).

Although the second permanent magnet 5 and the third permanent magnet 6 are both cylindrical permanent magnets in the example in FIG. 9, they are not limited to cylindrical ones but may be bar-shaped magnets whose cross section is polygonal.

In the condition shown in FIG. 9, the second permanent magnet 5 and the third permanent magnet 6 are so arranged that their S poles (5S, 6S) face each other.

When the second permanent magnet 5 or arm member 24 moves across line 24Lc in FIG. 9 from an area above line 24Lc to an area below line 24Lc in FIG. 9, the open area 240h of the holder 24h and the open area 110h of the holder 11h do not fully face each other (stand face to face) until the center of the second permanent magnet 5 reaches a prescribed point in the area below line 24Lc.

Since the magnetic field of the second permanent magnet 5 and the magnetic field of the third permanent magnet 6 are intercepted by the holder 24h and holder 11h, they do not interact with each other unless the open area 240h of the holder 24h and the open area 110h of the holder 11h fully face each other.

Therefore, until the open area 240h of the holder 24h and the open area 110h of the holder 11h fully face each other, the second permanent magnet 5 and third permanent magnet 6 do not generate a repulsive force due to homopolarity (S poles).

Figure 11:
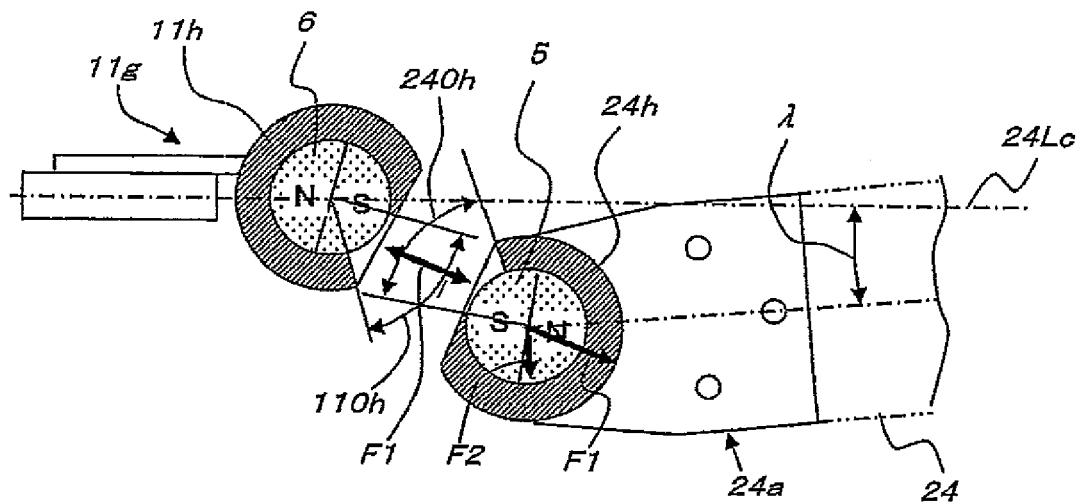
FIG. 11 is an enlarged fragmentary plan view showing the arm member turned from its state shown in FIG. 9.

FIG. 11 shows a condition where the second permanent magnet 5 turns by a prescribed angle λ in the area below line 24Lc, and the open area 240h of the holder 24h and the open area 110h of the holder 11h fully face each other.

In the condition shown in FIG. 11, since the S poles of the permanent magnets 5 and 6 fully face each other and the permanent magnets 5 and 6 repel each other, a repulsive force F1 is generated. A component force F2 is generated on the second permanent magnet 5 side, and the component force F2 gives the arm member 24 a counterclockwise torque. Since the arm member 24 is fixed on the disk member 22, given a torque to the arm member 24, rotation of the disk member 22 is encouraged.

As explained above, in the structure shown in FIGS. 8 to 11, since the permanent magnets 5 and 6 are covered by the holders 24h and 11h, until the open area 240h of the holder 24h and the open area 110h of the holder 11h fully face each other, a repulsive force is not generated between the permanent magnets 5 and 6. Thus, no resistance occurs to the torque of the arm member 24 and rotation of the disk member 22.

Then, when the open area 240h of the holder 24h and the open area 110h of the holder 11h fully face each other, a repulsive force is generated between the permanent magnets 5 and 6. In this condition, however, the repulsive force works to encourage rotation of the arm member 24 or rotation of the disk member 22.

Figure 12:
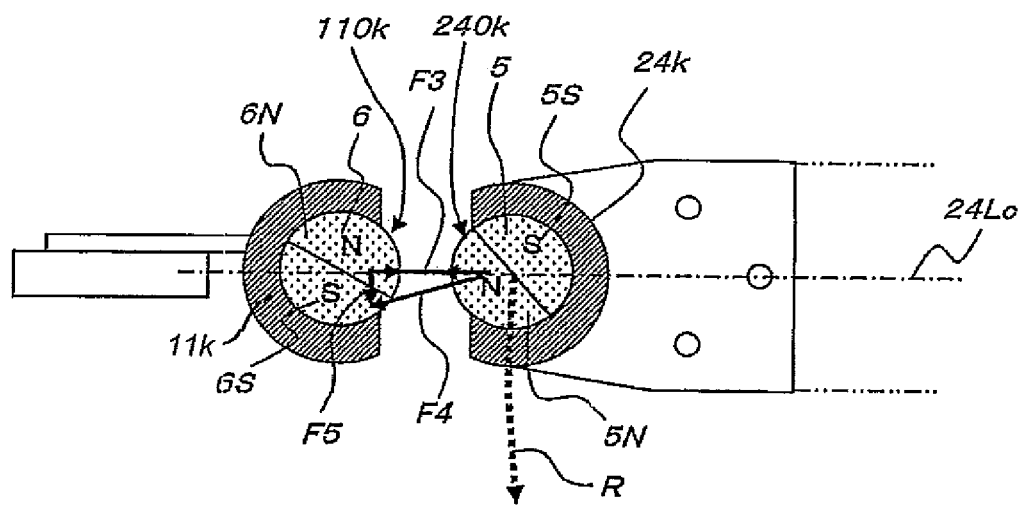
FIG. 12 is a plan view showing a variation of the structure shown in FIGS. 8 to 11.

FIG. 12 shows a variation of the structure illustrated in FIGS. 8 to 11. The variation in FIG. 12 is different from the structure in FIGS. 8 to 11 in terms of holder open areas and permanent magnet halving planes, resulting in a difference in the effect of encouraging rotation of the arm 24.

In FIG. 12, when the center of the second permanent magnet 5 is on line 24Lc, the open area 240k of the holder 24k for covering the second permanent magnet 5 and the open area 110k of the holder 11k for covering the third permanent magnet 6 are both symmetrical with respect to line 24Lc in FIG. 12 as the axis of symmetry, vertically in FIG. 12.

Also, the plane dividing the second permanent magnet 5 into S pole 5S and N pole 5N is inclined upward to the left in FIG. 12, and similarly the plane dividing the third permanent magnet 6 into S pole 6S and N pole 6N is inclined upward to the left in FIG. 12.

In the second permanent magnet 5, only the N pole 5N is exposed through the open area 240k. On the other hand, in the third permanent magnet 6, mainly the N pole 6N is exposed through the open area 110k, but the S pole 6S is also partially exposed.

In FIG. 12, as far as the second permanent magnet 5 is concerned, a repulsive force F3 against the N pole 6N of the third permanent magnet 6 (repulsive force between the magnetic poles 5N and 6N) and an attractive force F4 between the N pole 5N of the second permanent magnet 5 and the S pole of the third permanent magnet 6 are generated simultaneously.

The attractive force F4 has a component force F5 in the rotation direction R and such component force F5 works to rotate the second permanent magnet 5 toward arrow R. Consequently, generation of the component force F5 in the direction of arrow R in the attractive force F4 between the N pole 5N of the second permanent magnet 5 and the S pole of the third permanent magnet 6 leads to encouragement of rotation of the second permanent magnet 5 in the direction of arrow R.

In addition, when the second permanent magnet 5 moves downward from the position shown in FIG. 12 (toward arrow R: toward the rotation direction), the repulsive force F3 between the N pole 5N of the second permanent magnet 5 and the N pole of the third permanent magnet 6 works so that an effect of encouraging rotation of the second permanent magnet 5 or arm 24 in the direction of arrow R is achieved as in the structure shown in FIGS. 9 to 11.

Again in FIG. 2, a box type holding member 7 is mounted on the upper surface of the middle frame 12 and in the center area through which the rotary shaft 21 penetrates, and the bottom of the holding member 7 is open. The upper surface of the holding member 7 is a flat plane and is parallel to, and spaced a given distance from, the lower surface of the disk member 22.

The upper surface of the holding member 7 has a through hole which allows the rotary shaft 21 to rotate freely.

An annular fourth permanent magnet 8 is mounted on the back surface of the disk member 22 to surround the rotary shaft 21. On the other hand, an annular fifth permanent magnet 9 almost similar in shape to the fourth permanent magnet 8 is mounted on the upper surface of the holding member 7 to surround the rotary shaft 21.

Although not clearly shown, the fourth permanent magnet 8 is fitted to the back (lower) surface of the disk member 22 by a stainless steel stay (not shown) and the fifth permanent magnet 9 is also fitted to the fixed member 1 by a stainless steel stay (not shown).

The fourth permanent magnet 8 and the fifth permanent magnet 9 are arranged so that their surfaces facing each other have the same polarity. However, the permanent magnets 8 and 9 are spaced a given distance from each other in consideration of ease in attachment and detachment.

Since the fourth permanent magnet 8 and the fifth permanent magnet 9 are arranged opposite to each other and their surfaces facing each other have the same polarity, the fourth permanent magnet 8 and the fifth permanent magnet 9 repel each other. Such a repulsive force works so as to allow the whole rotary member 2 to float from the fixed member 1.

As a consequence, friction caused by the thrust which the weight of the rotary member 2 exerts on the fixed member 1 is reduced, which further decreases the loss in the rotating mechanism 100 and makes it a more efficient rotating mechanism.

Furthermore, once the rotary member 2 has started rotating on the principle of Aragon's disk, an eddy current occurs in the fourth permanent magnet 8.

This eddy current works to rotate the fourth permanent magnet 8, or the rotary member 2.

In short, once the rotary member 2 has been rotated, a force which rotates the rotary member 2 further is exerted.

Here, on the principle of Aragon's disk, a similar effect is achieved even if the material of the rotary member 2 is changed from aluminum to synthetic resin.

By moving the fifth permanent magnet 9 vertically in FIG. 2 by a lifting means (not shown), the relative distance between the fourth permanent magnet 8 and the fifth permanent magnet 9 can be steplessly adjusted, and thus the effect of the eddy current can be adjusted.

The rotation speed of the rotary member 2 can also be controlled by providing a means for adjusting the force generated by the effect of the eddy current and providing another attracting means such as magnet on the rotary member 2.

The lifting means for the fifth permanent magnet 9 and the attracting means may be activated by a hydraulic means.

Next, a first variation of the embodiment illustrated in FIGS. 1 to 11 will be described referring to FIGS. 13 to 16.

Here, in FIGS. 13 to 16, a whole rotating mechanism is represented by reference numeral 100B.

The embodiment shown in FIGS. 1 to 11 includes a plurality of first permanent magnets 4 mounted on the disk member 22 and arranged annularly and a plurality of coils 3 mounted on the fixed member 1 and arranged annularly on the radially inner side of the first permanent magnets.

On the other hand, the first variation shown in FIGS. 13 to 16 (rotating mechanism 100B) additionally includes a plurality of second coils 3B mounted on a circumference (on a circumference whose distance from the rotation center point O is constant) at regular intervals on the radially outer side of the first permanent magnets 4B arranged annularly and mounted on the disk member 22.

Figure 13:
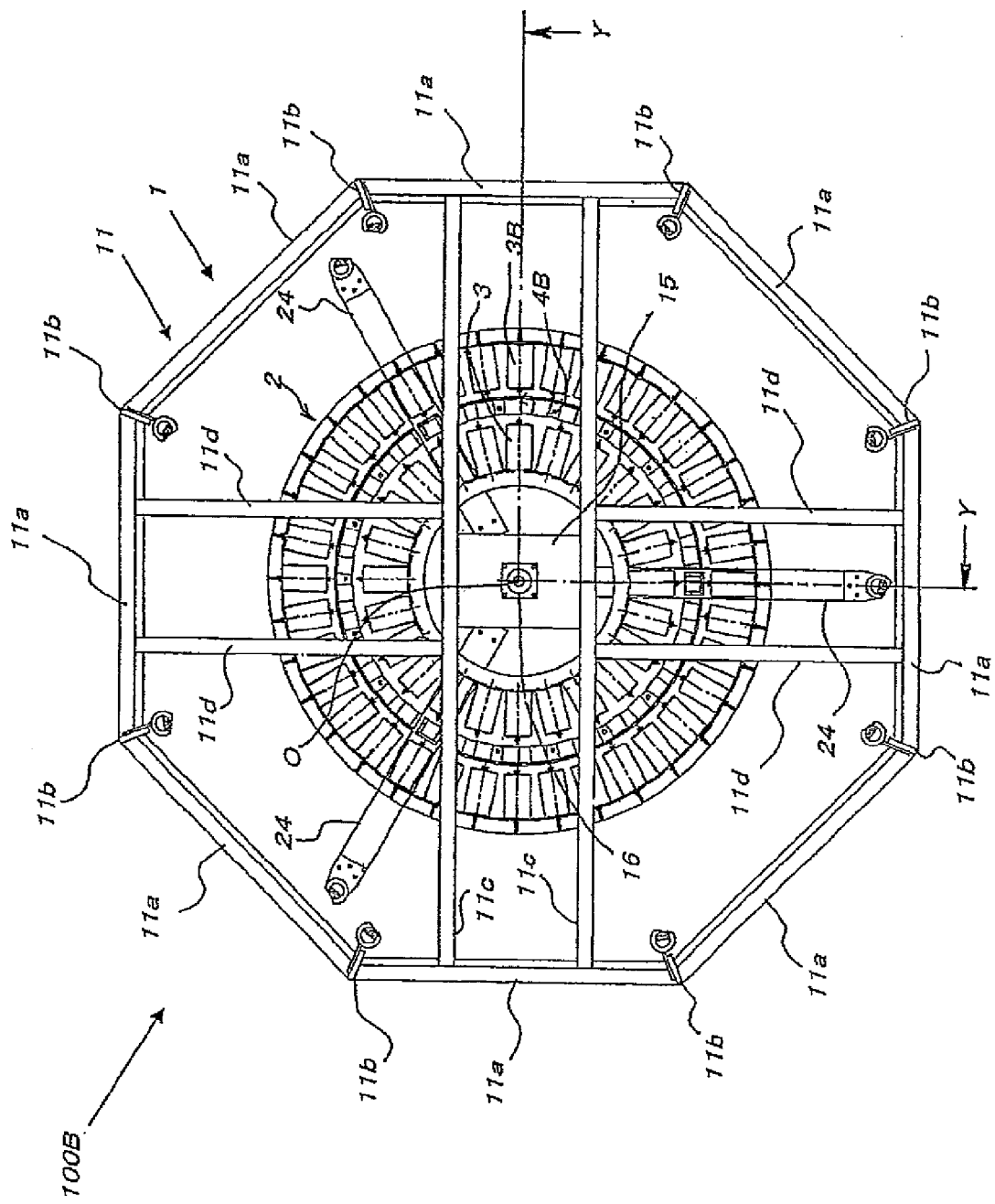
FIG. 13 is a plan view showing a first variation of the first embodiment.
Figure 14:
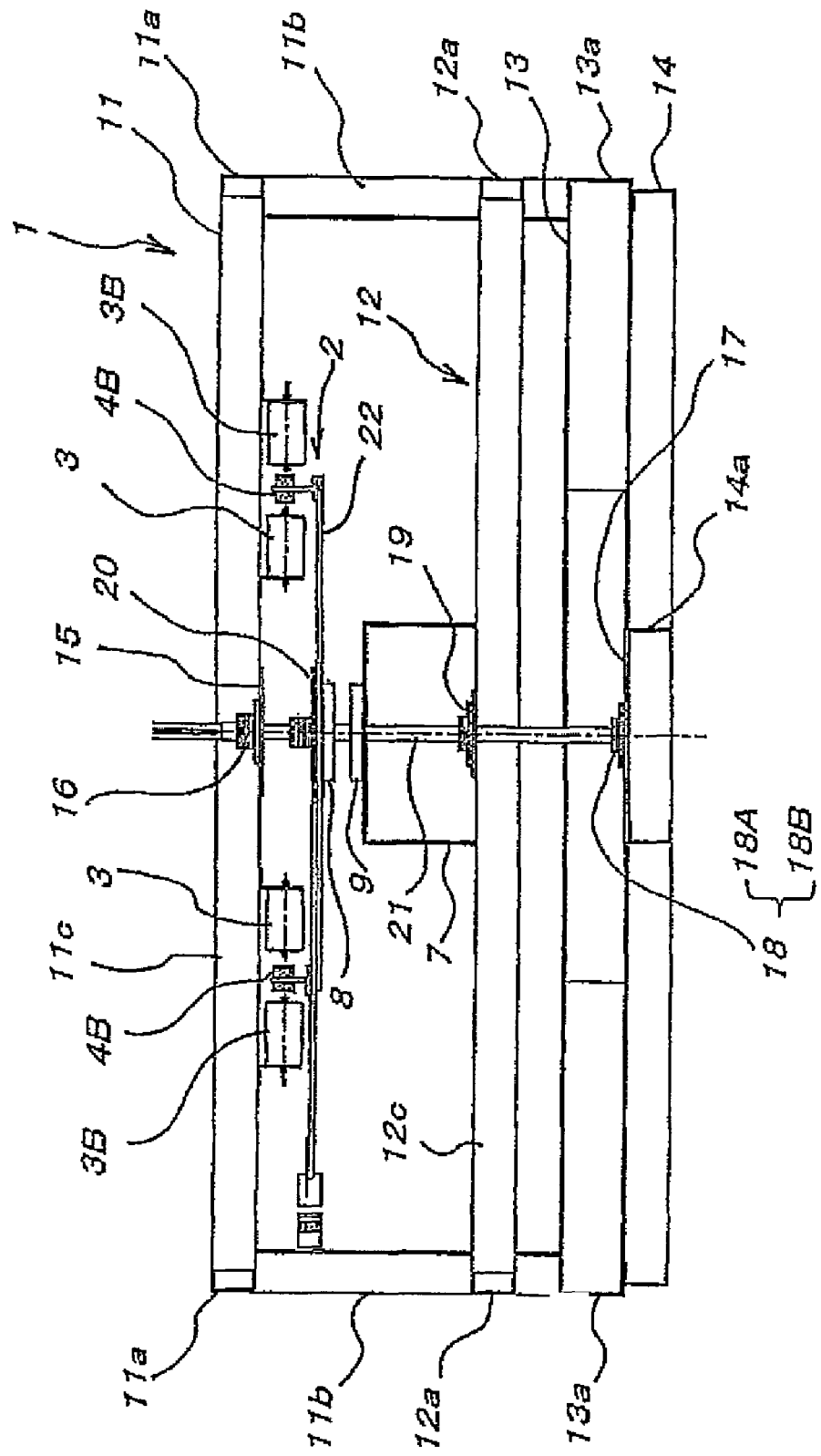
FIG. 14 is a sectional view taken along Y-Y in FIG. 13.
Figure 15:
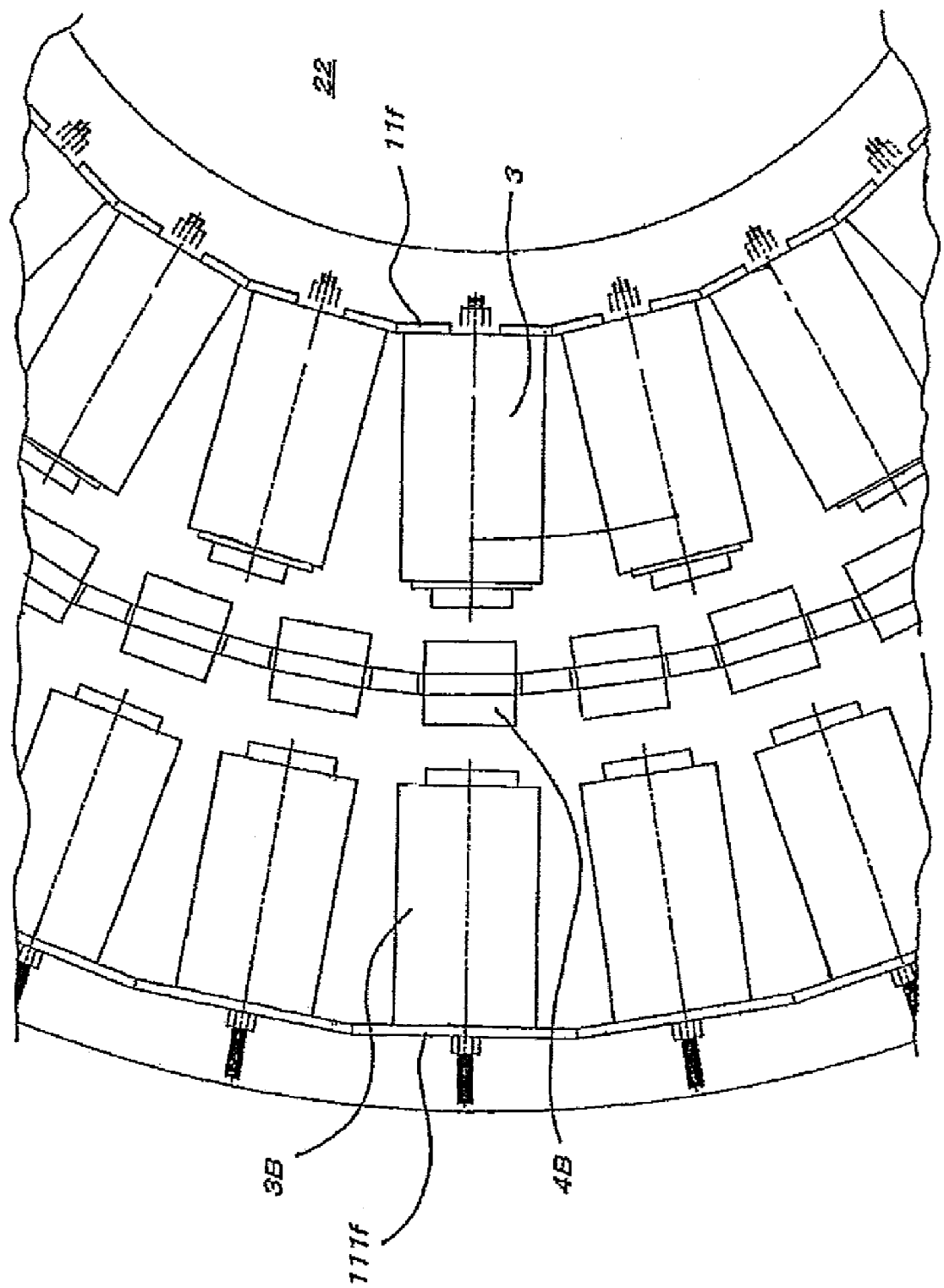
FIG. 15 is an enlarged fragmentary view of what is shown in FIG. 13.
Figure 16:
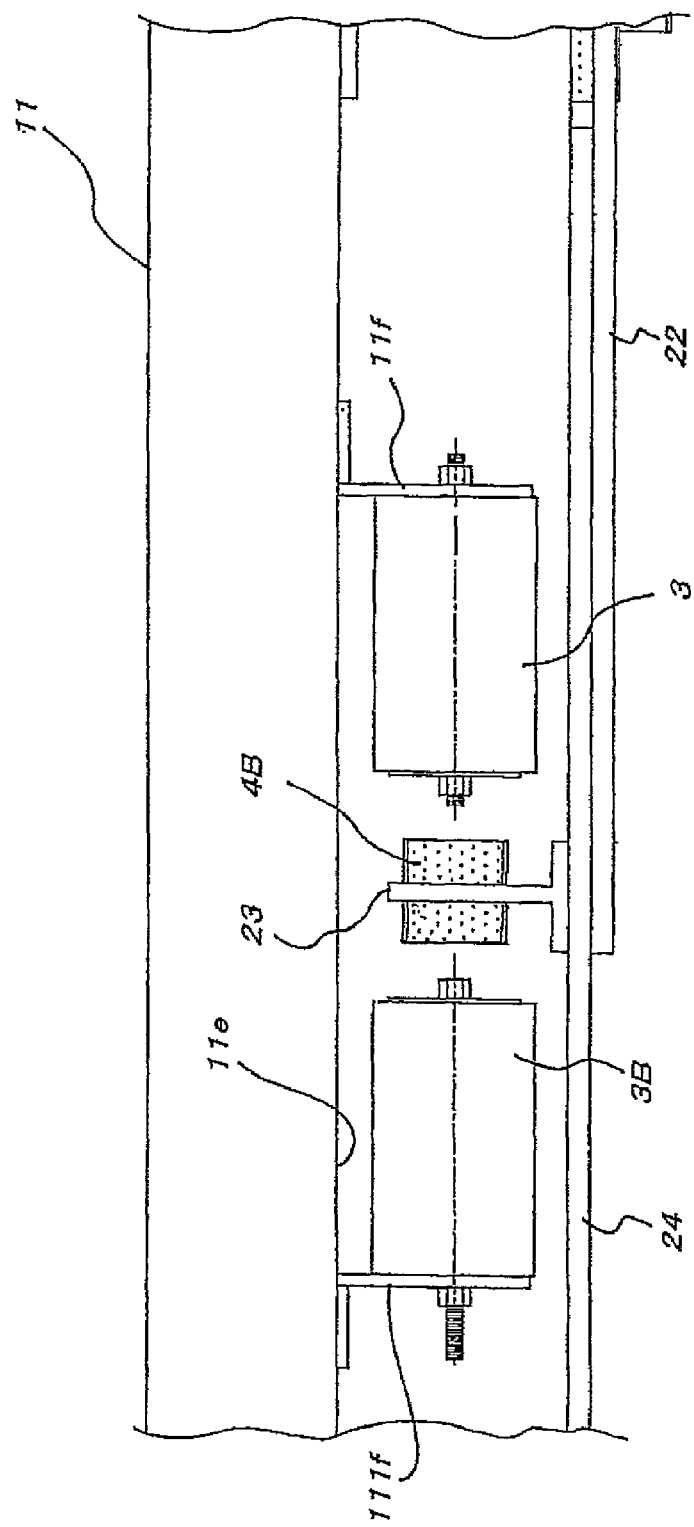
FIG. 16 is an enlarged fragmentary view of what is shown in FIG. 14.

FIG. 13 is a plan view of the first variation. FIG. 14 is a sectional view taken along Y-Y in FIG. 13. FIG. 15 is an enlarged fragmentary view of what is shown in FIG. 13. FIG. 16 is an enlarged fragmentary view of what is shown in FIG. 14.

In FIG. 16, a coil bracket 111$f$ is mounted on a canopy 11$e$ of the upper frame 11 on the radially outer side of a coil bracket 11$f$, and a second coil 3B is fitted to the coil bracket 111$f$.

In the first variation shown in FIGS. 13 to 16, by doubling the number of coils, the magnetic repulsive force between the first permanent magnet and the coils 3, 3B is increased, thereby improving the torque of the disk member 22.

Next, a second variation of the embodiment illustrated in FIGS. 1 to 11 will be described referring to FIG. 17.

Figure 17:
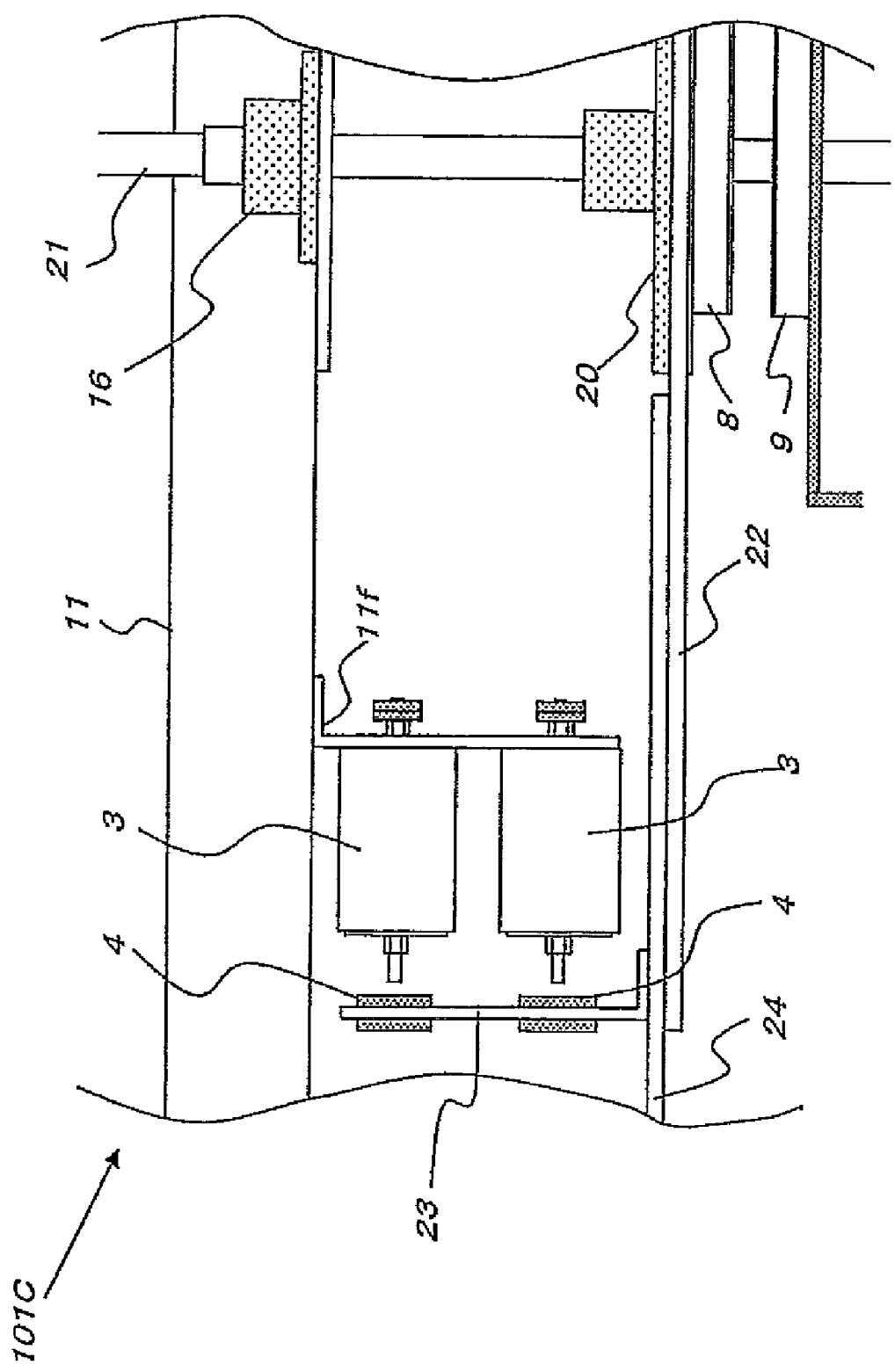
FIG. 17 is a fragmentary sectional view of a second variation of the first embodiment.

Here, a whole rotating mechanism shown in FIG. 17 according to the second variation is represented by reference numeral 101C.

As compared with the embodiment shown in FIGS. 1 to 11 (FIG. 4 in particular), which has a combination of a coil 3 and a permanent magnet 4 in only one tier vertically (in FIG. 4), the second variation in FIG. 17 has a combination of a coil 3 and a permanent magnet 4 vertically in two tiers.

In FIG. 17, the size of the coil mounting bracket 11$f$ fixed on the upper frame 11 is large vertically, and two coils 3 are fitted to the bracket 11$f$ vertically in two tiers.

On the other hand, a bracket 23 for permanent magnets 4 is fixed on the upper surface of the disk member 22 or the second arm member 24C, and the size of the bracket 23 is also large vertically. Two permanent magnets 4, 4, or an upper and a lower one, are fitted to the bracket 23.

The upper and lower coils 3, 3 on the coil mounting bracket 11$f$ and the upper and lower permanent magnets 4, 4 on the permanent magnet bracket 23 are arranged so as to fully face each other, and the magnetic field generated in the coils 3, 3 and the magnetic field generated in the permanent magnets 4, 4 repel each other. This magnetic repulsive force encourages rotation of the disk member 22.

The rest of the structure is the same as in the embodiment shown in FIGS. 1 to 11.

Next, a third variation of the embodiment illustrated in FIGS. 1 to 11 will be described referring to FIG. 18.

Figure 18:
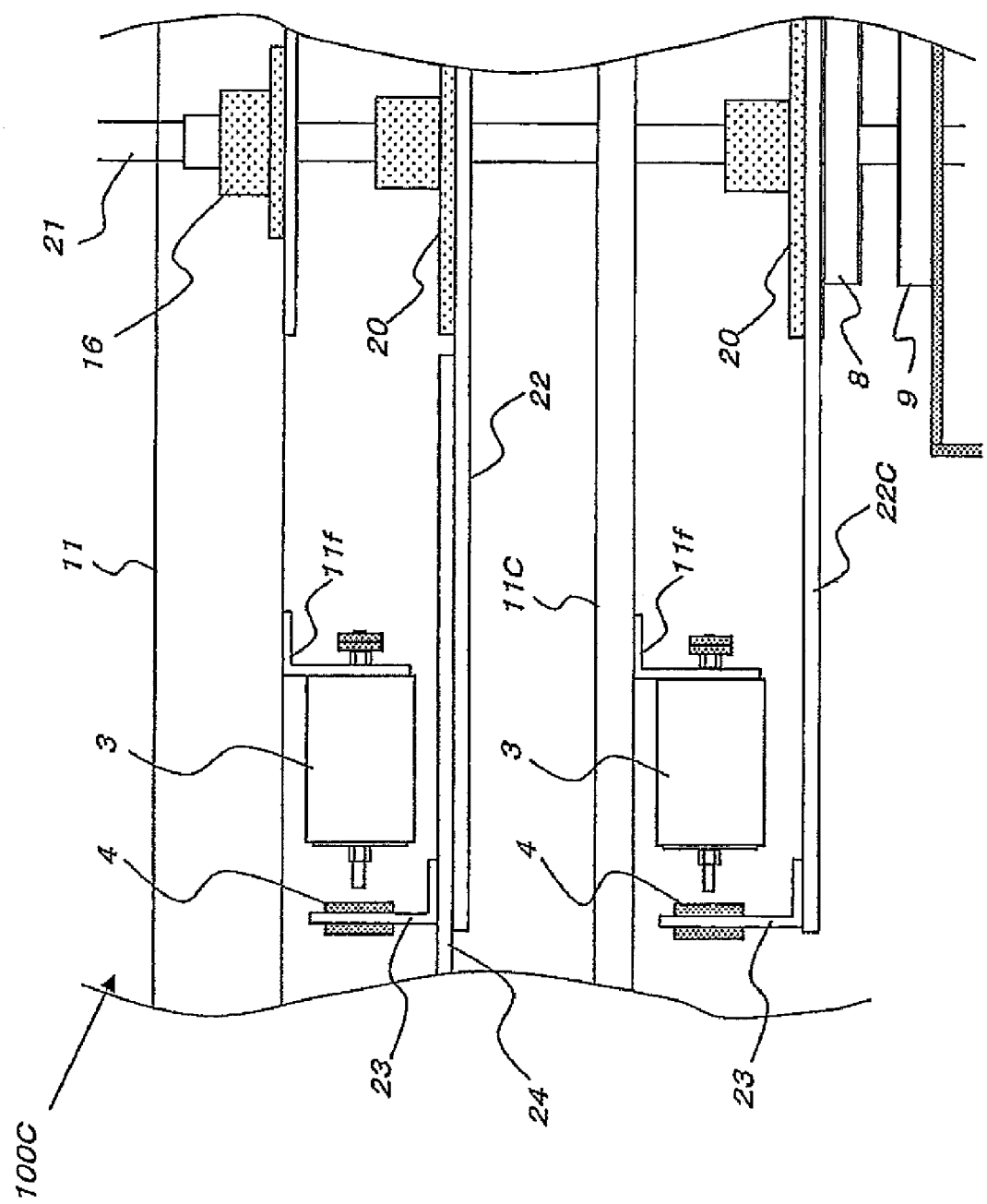
FIG. 18 is a fragmentary sectional view of a third variation of the first embodiment.

In FIG. 18, which shows the third variation, a whole rotating mechanism is represented by reference numeral 100C.

The rotating mechanism 100C according to the third variation in FIG. 18 also has a combination of a coil 3 and a permanent magnet 4 vertically in two tiers, like the second variation in FIG. 17. However, while in FIG. 17 coils or permanent magnets are mounted on a single bracket vertically in two tiers, the rotating mechanism 100C in FIG. 18 has two disk members (represented by reference numerals 22, 22C).

In FIG. 18, a horizontal member 11C is provided below the disk member 22, and the horizontal member 11C is provided as a fixed member parallel to the disk member 22 and the upper frame 11. A hub 20 is fixed below the horizontal member 11C, and the second disk member 22C is fitted to the hub 20.

Coil mounting brackets 11$f$ are fixed not only on the upper frame 11 but also to the back surface of the horizontal member 11C, and coils 3 are mounted on the brackets 11$f$.

Permanent magnet side brackets 23 are fixed not only on the disk member 22 but also to the upper surface of the second disk member 22C, and permanent magnets 4 are mounted on the brackets 23.

The coil 3 located on the back surface of the horizontal member 11C and the permanent magnet 4 located on the upper surface of the second disk member 22C fully face each other as shown in FIG. 18, and a repulsive force between the magnetic fields generated by both impels rotation of the second disk member 22C.

The fourth permanent magnet 8 to let the rotary member 2 float is mounted on the back surface of the second disk member 22C to face the fifth permanent magnet 9 to reduce the thrust caused by the weight of the rotary member 2.

The rest of the structure is the same as in the embodiment shown in FIGS. 1 to 11.

Next, a fourth variation of the embodiment illustrated in FIGS. 1 to 11 will be described referring to FIG. 19.

Here, a whole rotating mechanism according to the fourth variation is represented by reference numeral 101D.

Figure 19:
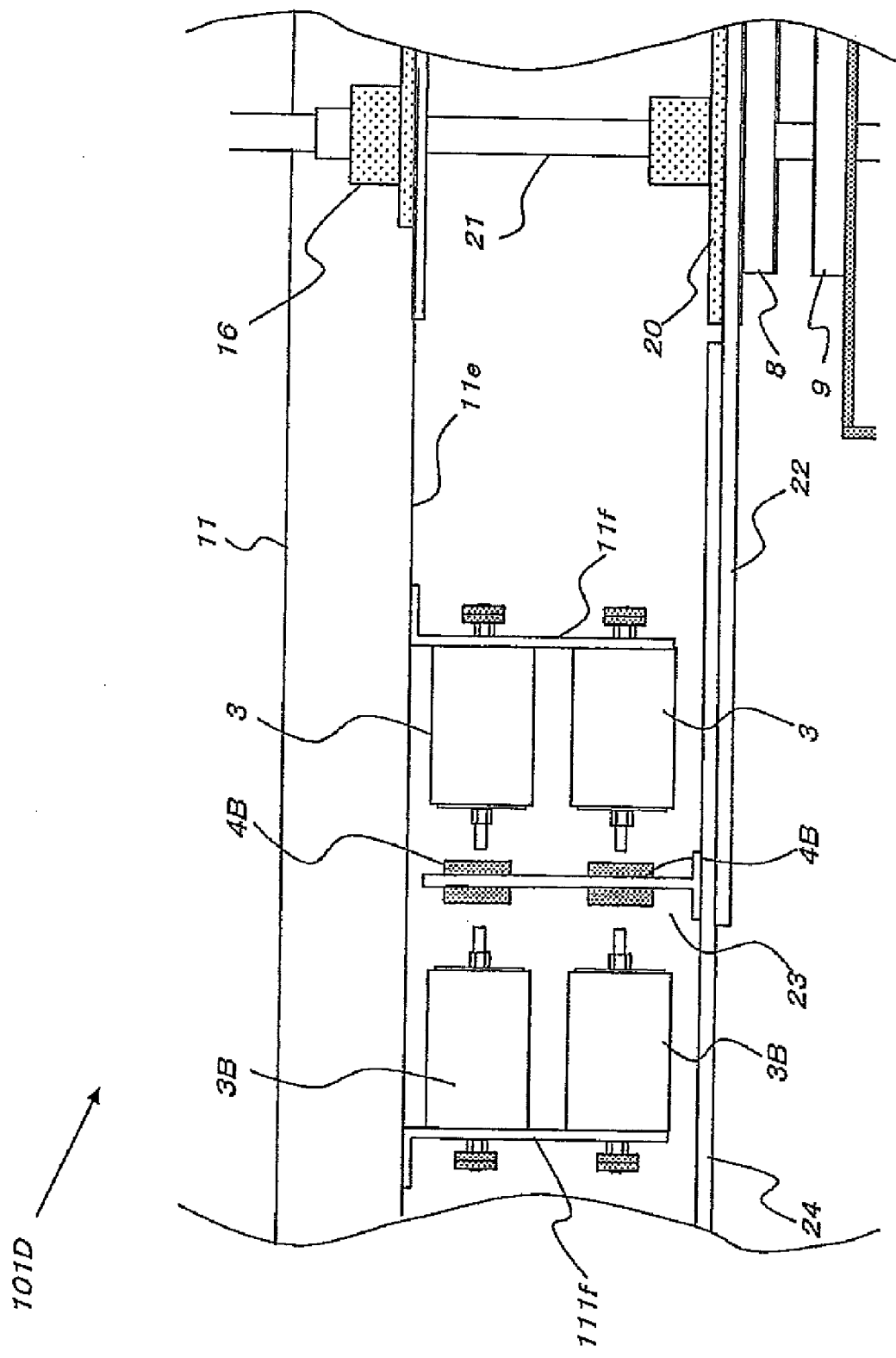
FIG. 19 is a fragmentary sectional view of a fourth variation of the first embodiment.

As shown in FIG. 19, the rotating mechanism 101D has a combination of a first permanent magnet 4B and two coils 3, 3B vertically in two tiers, while the first variation (rotating mechanism 100B) in FIGS. 13 to 16 has a combination of a first permanent magnet 4B and two coils 3, 3B vertically in only one tier with particular reference to FIG. 16.

In FIG. 19, coil mounting brackets 11$f$ and 111$f$ are mounted on the upper frame (canopy 11$e$) at different radial distances, and coils 3, 3 are mounted on each of the brackets 11$f$, 111$f$ vertically in two tiers.

In addition, a bracket 23 for permanent magnets 4 is fixed on the upper surface of the disk member 22 (the upper surface of the arm member 24 in the cross section shown in FIG. 19), and first permanent magnets 4B, 4B are located on the bracket 23 vertically in two tiers.

The rest of the structure in the fourth variation in FIG. 19 is the same as in the first variation.

Next, a fifth variation of the embodiment illustrated in FIGS. 1 to 11 will be described referring to FIG. 20.

Figure 20:
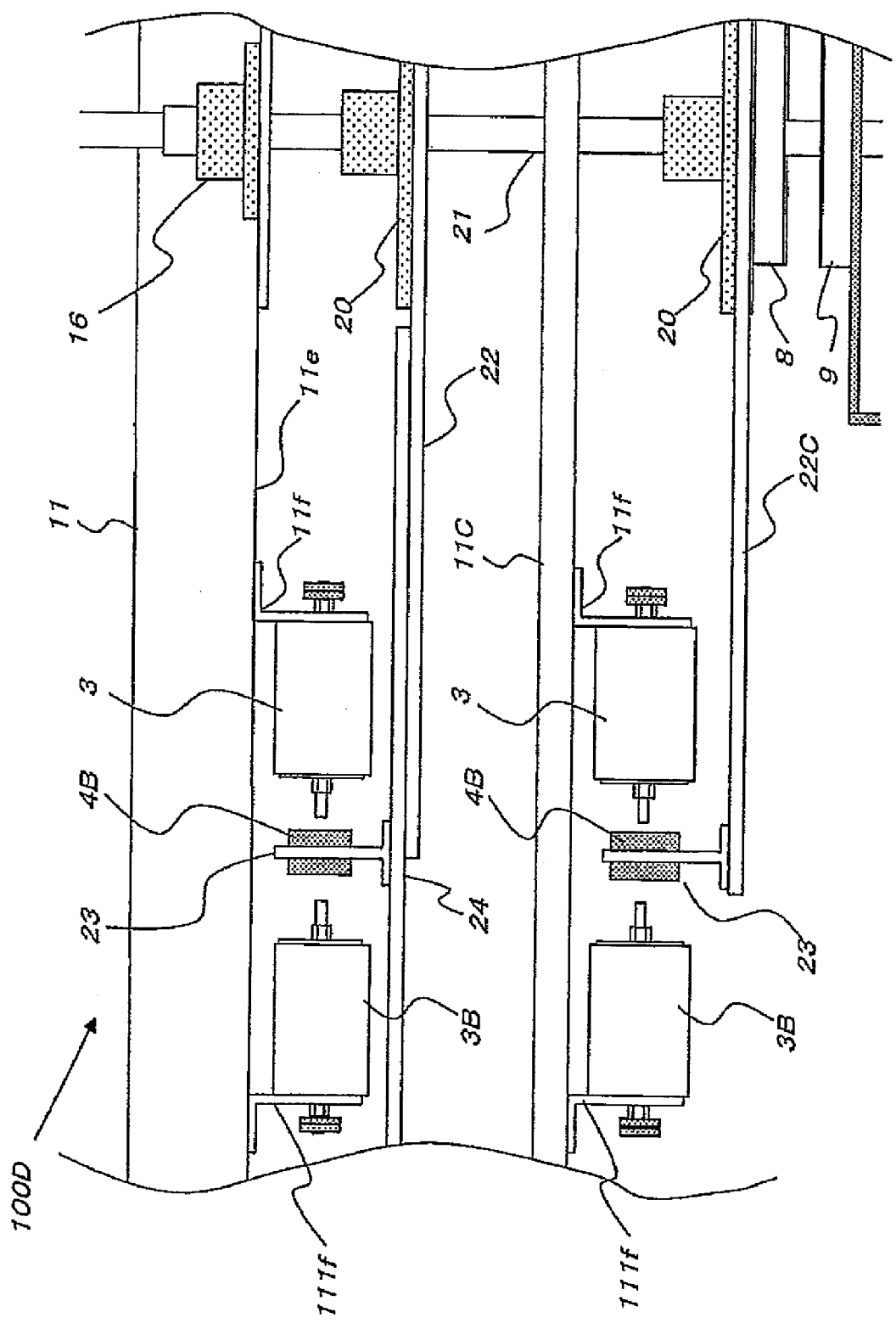
FIG. 20 is a fragmentary sectional view of a fifth variation of the first embodiment.

A whole rotating mechanism according to the fifth variation is represented by reference numeral 100D in FIG. 20.

As shown in FIG. 20, the rotating mechanism 100D has a combination of a first permanent magnet 4B and two coils 3, 3B vertically in two tiers, like the second embodiment shown in FIG. 19.

In the fifth variation in FIG. 20, regarding a combination of a first permanent magnet 4B and two coils 3, 3B, the upper combination is the same as shown in FIG. 16.

In order to add a lower combination of a permanent magnet 4B and two coils 3, 3B in FIG. 20, a horizontal member 11C is provided below the disk member 22 and the horizontal member 11C is provided as a fixed member parallel to the disk member 22 and the upper frame 11, like the third variation in FIG. 18. A hub 20 is fixed below the horizontal member 11C, and the second disk member 22C is mounted on the hub 20.

The way the coils are mounted on the horizontal member 11C and the way the permanent magnet is mounted on the second disk member 22C are the same as in the first variation shown in FIG. 16.

The rest of the structure in the fifth variation in FIG. 20 is the same as in the first variation in FIG. 16.

Although not shown, in the rotating mechanism 100 according to the first embodiment, the rotating mechanism 100B according to the first variation, the rotating mechanism 100C according to the third variation, the rotating mechanism 101D according to the fourth variation, and the rotating mechanism 100D according to the fifth variation, the whole apparatus may be covered by concrete or a metal plate or a rigid plastic structure so that the air pressure inside the covered space is reduced to reduce the air resistance in rotation and thereby make it a rotating mechanism with a higher rotation efficiency.

Next, a second embodiment of the present invention will be described referring to FIGS. 21 and 22.

Figure 21:
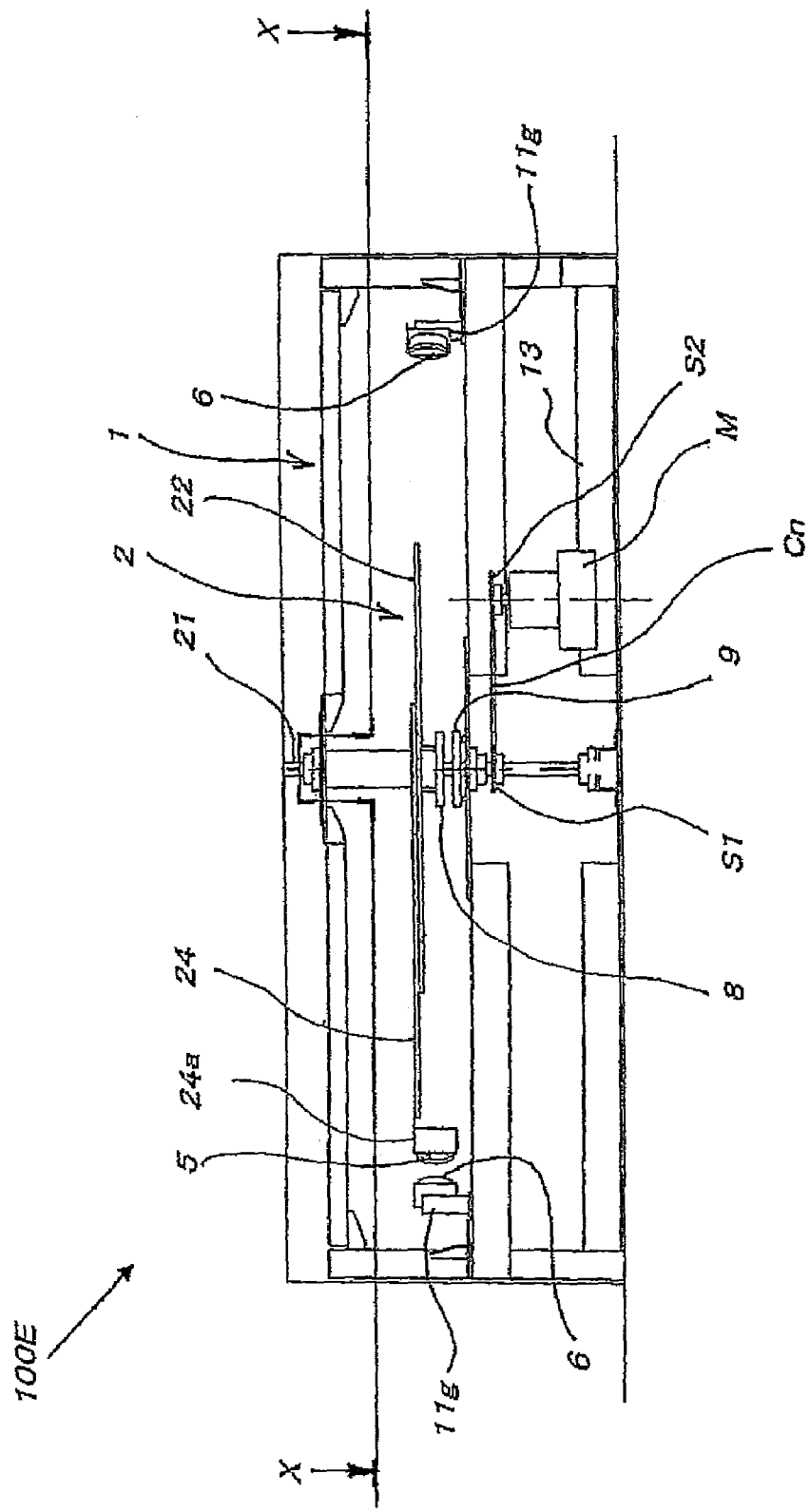
FIG. 21 is a longitudinal sectional view of a second embodiment of the invention.
Figure 22:
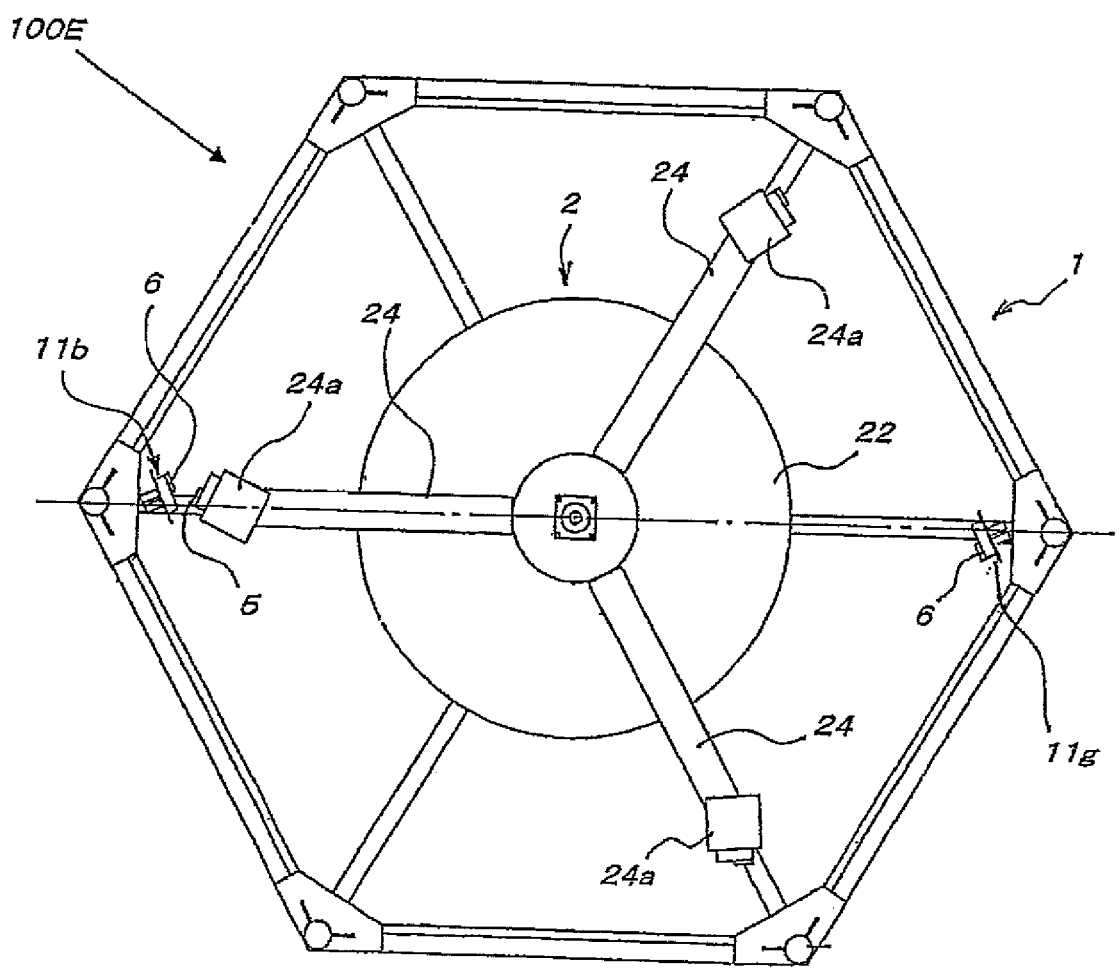
FIG. 22 is a sectional view taken along X-X in FIG. 21.

A whole rotating mechanism according to the second embodiment is represented by reference numeral 100E in FIGS. 21 and 22.

In FIGS. 21 and 22, the rotating mechanism 100E is so structured that the coils 3 and first permanent magnets 4 in the rotating mechanism 100 in FIGS. 1 to 11 are omitted and rotation of the rotary member 2 is maintained only by the magnetic repulsive force between second permanent magnets 5 fitted to three arm members 24 of the rotary member 2 and two third permanent magnets 6 fitted to the fixed member 1.

In the second embodiment in FIGS. 21 and 22, like the embodiment in FIGS. 1 to 11, a second permanent magnet 5 is fitted to an arm member 24 of the rotary member 2 by an attachment 24a, and a third permanent magnet 6 is fitted to the fixed member 1 by an attachment 11g.

Although not clearly shown in FIGS. 21 and 22, the second permanent magnet 5 and the third permanent magnet 6 are provided with a movable cover for adjusting the orientation or magnitude of the magnetic force, and the movable cover has the same structure as the holders 11h, 24h in FIGS. 8 to 11 and works similarly.

In FIG. 21, a fourth permanent magnet (one magnet to let the rotary member 2 float) 8 is fitted below the disk member 22 on the rotary shaft 21, and a fifth permanent magnet (one magnet to let the rotary member 2 float) 9 is fitted below it.

A first sprocket S1 is fixed on the rotary shaft 21 below the fixed fifth permanent magnet 9.

A small motor M for starting the rotary member 2 is mounted on the lower frame 13 of the fixed member 1. A second sprocket S2 is fitted to the tip of the output axis of the motor M.

The first sprocket S1 and the second sprocket S2 are engaged through a chain Cn.

As the motor M is driven, rotational output of the motor M is transmitted through the second sprocket S2, chain Cn and first sprocket S1 to the rotary shaft 21 to rotate the rotary shaft 21.

The structure and advantageous effects of the second embodiment in FIGS. 21 and 22 other than the abovementioned are the same as in the first embodiment in FIGS. 1 to 11.

Next, a third embodiment will be described referring to FIGS. 23 and 24.

Figure 23:
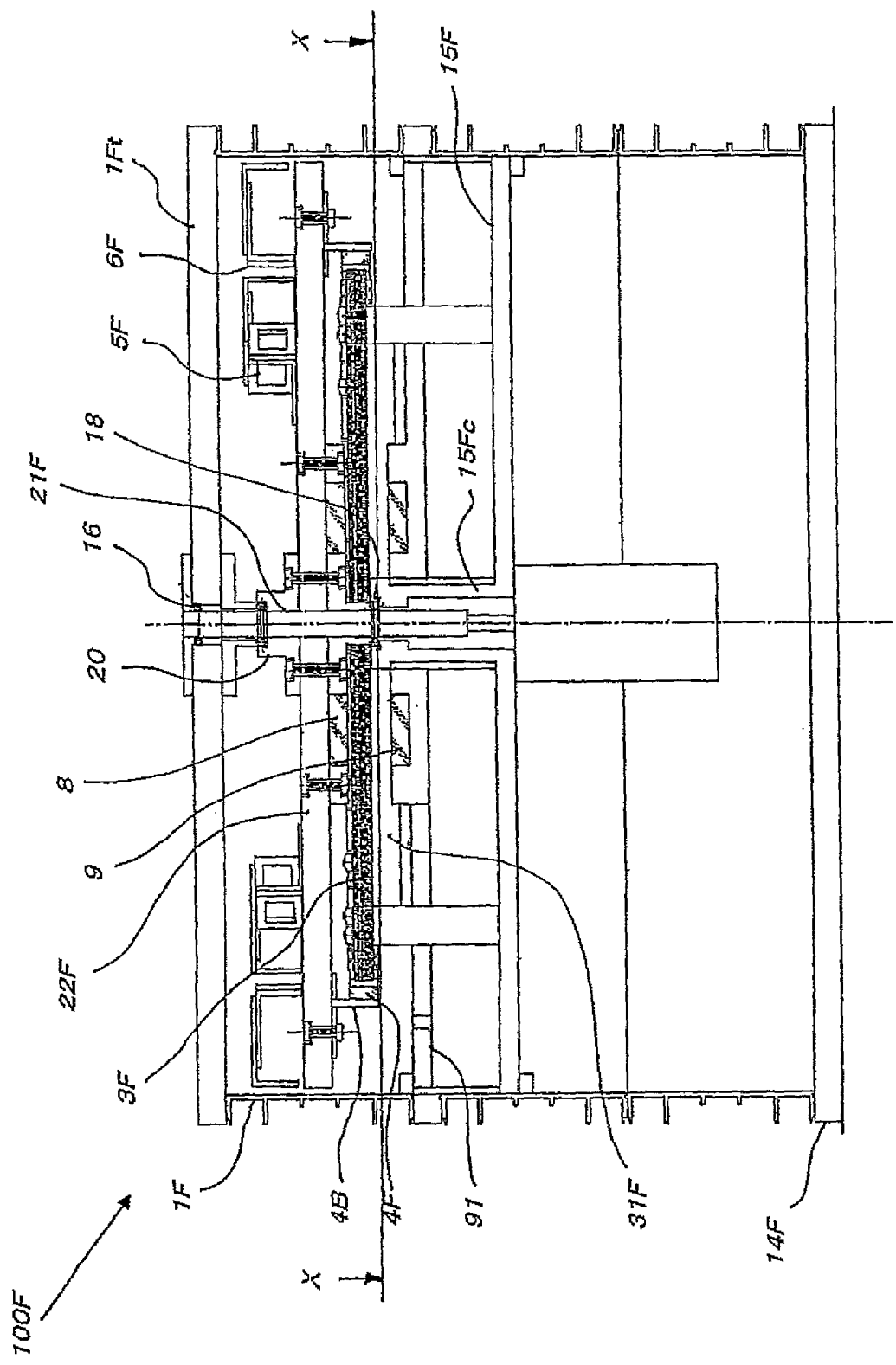
FIG. 23 is a longitudinal sectional view of a third embodiment of the invention.
Figure 24:
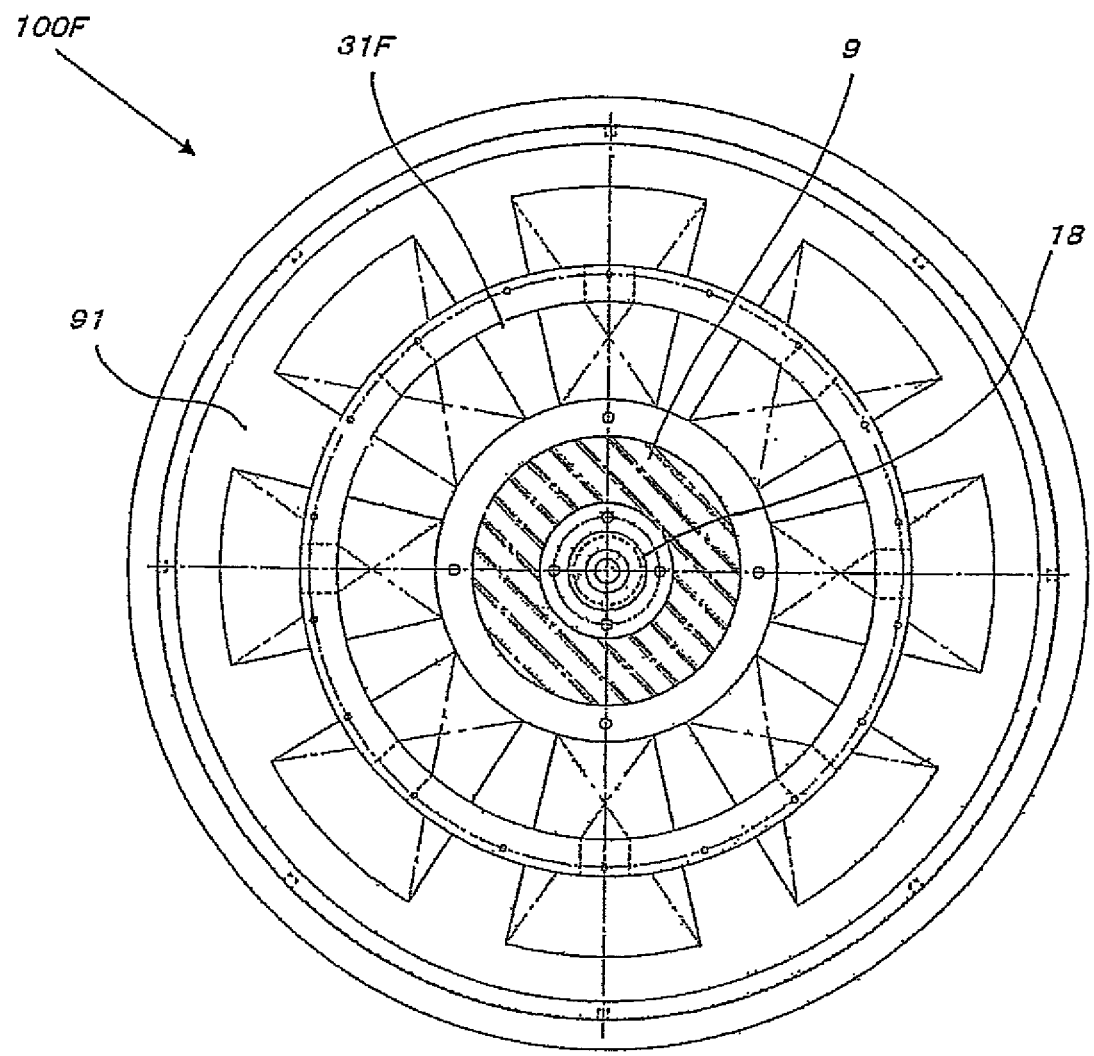
FIG. 24 is a sectional view taken along X-X in FIG. 23.

A whole rotating mechanism according to the third embodiment is represented by reference numeral 100F in FIGS. 23 and 24.

The rotating mechanism 100F according to the third embodiment in FIGS. 23 and 24 is applied to electrical generators.

In FIG. 23, the fixed member of the rotating mechanism 100 includes a cylindrical casing 1F, a top cover 1Ft for covering the upper opening of the casing 1F, a base 14F for covering the lower opening of the casing 1F, and a partition 15F located in the middle of the casing 1F.

A radial bearing 16 is provided in the center of the top cover 1Ft, and a thrust bearing 18 is provided in the center of the partition 15F. The rotary shaft 21F is journalled by the radial bearing 16 and thrust bearing 18.

A rotor (or disk member) 22F is fixed on an upper portion of the rotary shaft through a hub 20.

An annular magnet mounting member 4B, which is concentric with the rotary shaft 21, is provided on the radially outer rim of the back surface of the rotor 22F. A plurality of first permanent magnets 4F is fitted all around the inner periphery of the magnet mounting member 14B.

A fourth permanent magnet 8 is located in a radially inner area (center area) of the back surface of the rotor 22F to surround the rotary shaft 21F.

A plurality of second permanent magnets 5F is fitted at regular intervals in a radially outer area of the upper surface of the rotor 22F on a circumference concentric with a circumference of the rotary shaft 21.

A plurality of third permanent magnets 6F is fitted at regular intervals radially outside the second permanent magnets 5F around the circumference.

A coil supporting member 31F for supporting a disk coil 3F for electricity generation is provided in an area between the rotor 22F and the partition 15F. The coil supporting member 31F is located at the upper end of a cylindrical part 15Fc in the center of the partition 15F. The coil supporting member 31F is formed integrally with the partition 15F.

A movable partition 91 is located in the area between the coil supporting member 31F and the partition 15F. This movable partition 91 is so structured as to slide on the inner wall surface of the cylindrical casing 1F by a hydraulic means (not shown) while keeping a liquid-tight condition.

In the center of the movable partition 91, an annular fifth permanent magnet 9 is fitted in a way to surround the rotary shaft 21F. Hence, as the movable partition 91 moves vertically in FIG. 23, the fifth permanent magnet 9 also moves up and down vertically in FIG. 23.

The surfaces of the fourth permanent magnet 8 and fifth permanent magnet 9 that face each other have the same polarity and repel each other. Hence, as the fifth permanent magnet 9 is brought closer to the fourth permanent magnet 8, buoyancy is given to the rotary member, and the buoyancy works to decrease the thrust exerted on the thrust bearing 18 and to reduce the rotation resistance.

In the electrical generator having the rotating mechanism 100F according to the third embodiment in FIGS. 23 and 24, the electrical generating efficiency can be improved by reducing the resistance which suppresses rotation.

Next, a fourth embodiment will be described referring to FIGS. 25 and 26.

Figure 25:
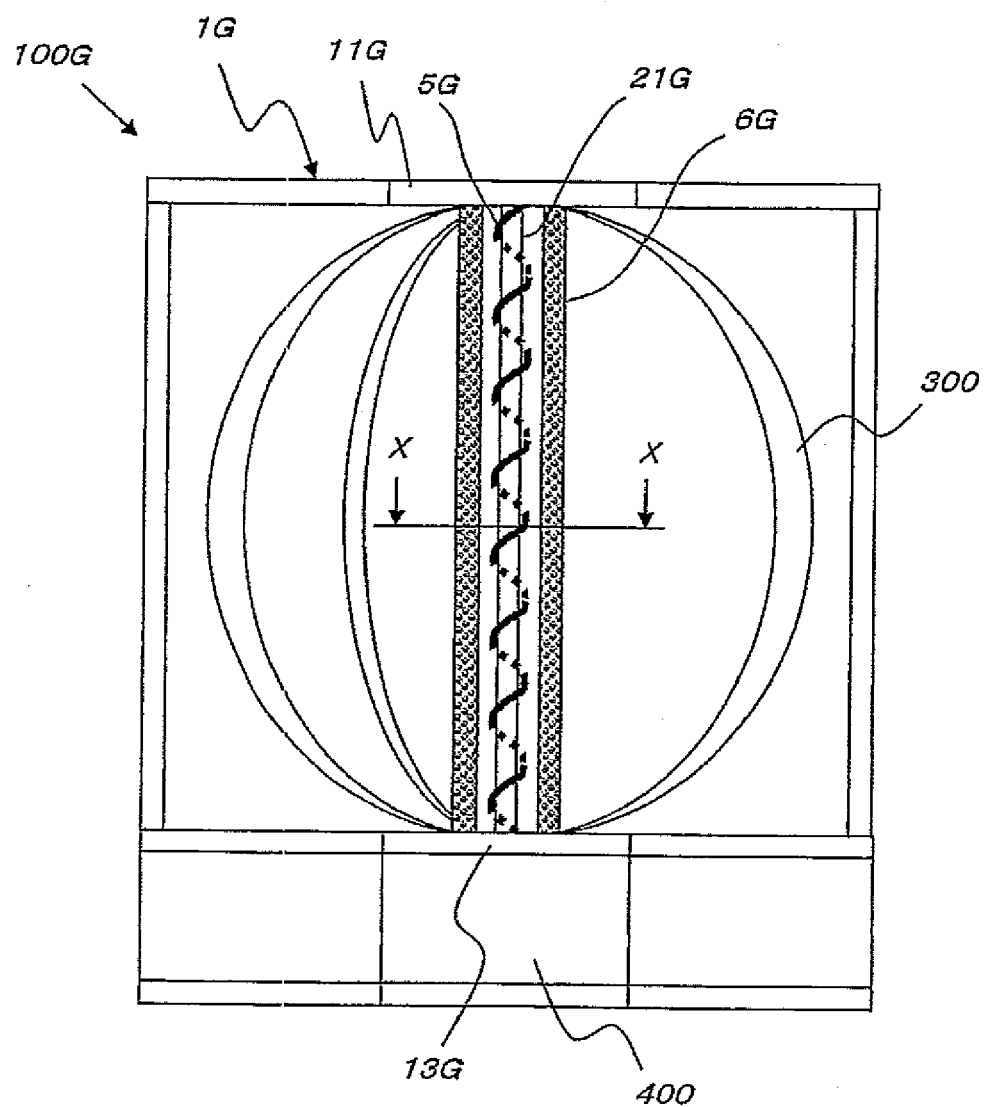
FIG. 25 is a front view of a fourth embodiment of the invention.
Figure 26:
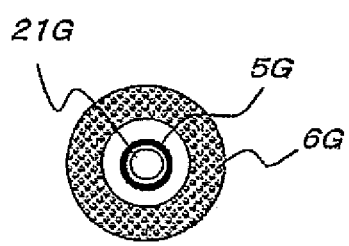
FIG. 26 is a sectional view taken along X-X in FIG. 25.

A whole rotating mechanism according to the fourth embodiment is represented by reference numeral 100G in FIGS. 25 and 26.

The rotating mechanism 100G according to the fourth embodiment in FIGS. 25 and 26 is applied to an electrical generator with a Darius windmill.

In FIG. 25, the rotating mechanism 100G includes a casing 1G, a rotary shaft 21G disposed in the center of the casing 1G, a fixed cylindrical coil 6G located in a way to surround the rotary shaft 21G, and a Darius windmill 300 which rotates together with the rotary shaft 21G.

FIG. 26 is a sectional view taken along X-X in FIG. 25. Although not clearly shown, a spiral groove 5G is formed in the rotary shaft 21G, and the groove 5G is coated with liquid magnet and sealed by a cover-like member (not shown).

The upper end of the rotary shaft 21G is journalled by a bearing (radial bearing, not shown) provided on an upper member 11G of the casing, and the lower end of the rotary shaft 21G is journalled by a bearing (composite bearing as a combination of a radial bearing and a thrust bearing, not shown) provided on a lower member 13G of the casing.

In the rotating mechanism 100G thus structured, when a force of wind rotates the windmill 300, the spiral groove 5G coated with liquid magnet, spirally disposed inside the cylindrical coil 6G, rotates as well. Due to the relative rotary motion of the cylindrical coil 6G and magnet 5G, an induced current (electricity generating current) is generated. Since any ferrous metal that is attracted to the magnet is not used here, electricity can be generated easily.

The generating current generated in the coil 6G is stored in a battery 400 located at the bottom of the casing 1G.

Since the rotating mechanism 100G does not use any ferrous metal, if a weak wind rotates the rotary shaft, electricity can be generated.

Also, by doubling the windmill shaft and journalling the outer shaft by a bearing and using the thrust for internal rotation, thrust bearing rotation resistance caused by the weight of the windmill 300 can be reduced, and resistance in rotation of the windmill 300 can be substantially reduced. As a consequence, the efficiency as an electrical generator can be increased.

It is added that the illustrated embodiments are for illustrative purposes only, and the foregoing description is not intended to limit the technical scope of the present invention.

The invention claimed is:

1. A rotating mechanism comprising:
   a fixed member having a bearing;
   a rotary member including a rotary shaft journalled by the bearing and a disk member provided on the rotary shaft;
   a plurality of coils mounted on the fixed member and arranged at regular intervals on a circle centered on the rotary shaft; and
   first permanent magnets mounted on the disk member and arranged at regular intervals on a circle centered on the rotary shaft to face the coils, the first permanent magnets alternating between a N pole and a S pole; and wherein
   each of the plurality of coils is penetrated by a core member of nonmagnetic material and a member of magnetic material is located on its end face away from its end face opposite to the first permanent magnets.

2. The rotating mechanism as described in claim 1, further comprising:
   an arm member fitted to the disk member;
   a second permanent magnet held on a tip of the arm member by a first magnet holding member;
   a third permanent magnet located radially outside the arm member in an area of the fixed member and held by a second magnet holding member; and
   a repulsive force is generated when the second permanent magnet moves in a direction of rotation from a condition in which the second permanent magnet is in the same circumferential position as the third permanent magnet.

3. The rotating mechanism as described in claim 2, wherein:
   the first magnet holding member is made of nonmagnetic material and surrounds the second permanent magnet and forms an open area which allows radiation of lines of magnetic force from the second permanent magnet;
   the second magnet holding member is made of magnetic material and surrounds the third permanent magnet and forms an open area which allows radiation of lines of magnetic force from the third permanent magnet; and
   when the open area of the first magnet holding member and the open area of the second magnet holding member do not face each other, no magnetic interaction occurs between the second permanent magnet and the third permanent magnet but when the open areas face each other, magnetic repulsion occurs between the second permanent magnet and the third permanent magnet.

4. The rotating mechanism as described in claim 3, further comprising:
   a fourth permanent magnet mounted on a lower surface of the disk member; and
   a fifth permanent magnet located on the fixed member in an area below the fourth permanent magnet, the fifth permanent magnet facing the fourth permanent magnet and having a same polarity as the fourth permanent magnet.

5. The rotating mechanism as described in claim 2, further comprising:
   a fourth permanent magnet mounted on a lower surface of the disk member; and
   a fifth permanent magnet located on the fixed member in an area below the fourth permanent magnet, the fifth permanent magnet facing the fourth permanent magnet and having a same polarity as the fourth permanent magnet.

6. The rotating mechanism as described in claim 2, wherein:
   each first magnet holding member is made of nonmagnetic material and includes an open area that allows radiation of lines of magnetic force from a held second permanent magnet;
   each second magnet holding member is made of magnetic material and includes an open area that allows radiation of lines of magnetic force from a held third permanent magnet; and wherein
   no magnetic interaction occurs between one of the plurality of second permanent magnets and one of the third permanent magnets when open areas of respective first and second magnet holding members do not face each other; and magnetic repulsion occurs between the one of the plurality of second permanent magnets and the one of the plurality of third permanent magnets when the open areas of the respective first and second magnet holding members face each other.

7. The rotating mechanism as described in claim 6, further comprising:
   a fourth permanent magnet mounted on a lower surface of the disk member; and
   a fifth permanent magnet located on the fixed member in an area below the fourth permanent magnet, the fifth permanent magnet facing the fourth permanent magnet and having a same polarity as the fourth permanent magnet.

8. The rotating mechanism as described in claim 1, further comprising:
   a fourth permanent magnet mounted on a lower surface of the disk member; and
   a fifth permanent magnet located on the fixed member in an area below the fourth permanent magnet, the fifth permanent magnet facing the fourth permanent magnet and having a same polarity as the fourth permanent magnet.

9. The rotating mechanism as described in claim 1, further comprising:
   a plurality of arm members extending from the disk member;
   a plurality of second permanent magnets, each being held on a respective tip of one of the plurality of arm members by a respective first magnet holding member;
   a plurality of third permanent magnets located about a circumference of the fixed member, each held radially outside a range of the plurality of arm members by a respective second magnet holding member; and wherein
   movement of the plurality of second permanent magnets in a direction of rotation away from a condition in which at least one of the second permanent magnets is in a same circumferential position as a respective third permanent magnet generates a repulsive force.

* * * * *